(12) United States Patent
Nee et al.

(10) Patent No.: US 10,090,993 B2
(45) Date of Patent: Oct. 2, 2018

(54) PACKAGED CIRCUIT

(71) Applicant: ALi Corporation, Hsinchu (TW)

(72) Inventors: Hsu-Che Nee, Taipei (TW); Chi-Bin Chen, Taipei (TW); Yi-Hsien Cheng, Taipei (TW)

(73) Assignee: ALi Corporation, Hsinchu (TW)

( * ) Notice: Subject to any disclaimer, the term of this patent is extended or adjusted under 35 U.S.C. 154(b) by 0 days.

(21) Appl. No.: 15/669,765

(22) Filed: Aug. 4, 2017

(65) Prior Publication Data

US 2017/0331617 A1 Nov. 16, 2017

(30) Foreign Application Priority Data

Aug. 19, 2016 (CN) .......................... 2016 1 0688892
Apr. 21, 2017 (CN) .......................... 2017 1 0265003
Jul. 27, 2017 (CN) .......................... 2017 1 0623594

(51) Int. Cl.
| | | |
|---|---|---|
| *H04L 7/06* | (2006.01) | |
| *H04L 7/00* | (2006.01) | |
| *H04L 7/04* | (2006.01) | |
| *G06F 13/40* | (2006.01) | |
| *G09G 5/00* | (2006.01) | |
| *H04L 25/14* | (2006.01) | |

(52) U.S. Cl.
CPC ............ *H04L 7/0091* (2013.01); *G06F 13/40* (2013.01); *G06F 13/4063* (2013.01); *G09G 5/006* (2013.01); *H04L 7/04* (2013.01); *H04L 7/06* (2013.01); *H04L 25/14* (2013.01)

(58) Field of Classification Search
CPC ... H04L 25/14; H04L 7/06; H04L 7/14; H04L 7/0091; H04L 7/04; G06F 13/40; G06F 13/4063; G09G 5/006
See application file for complete search history.

(56) References Cited

U.S. PATENT DOCUMENTS

| | | | | |
|---|---|---|---|---|
| 5,805,520 | A | | 9/1998 | Anglada et al. |
| 6,101,567 | A | * | 8/2000 | Kim .................... G06F 13/4018 709/249 |
| 6,496,583 | B1 | * | 12/2002 | Nakamura ........ H04L 25/03866 380/268 |
| 9,692,448 | B1 | * | 6/2017 | Kong ...................... H03M 9/00 |
| 2009/0259878 | A1 | * | 10/2009 | Remlin ............... G06F 13/4045 713/600 |
| 2013/0194445 | A1 | * | 8/2013 | Brown .................. H04N 5/378 348/222.1 |
| 2014/0266340 | A1 | * | 9/2014 | Huang ..................... H03L 7/07 327/156 |

* cited by examiner

*Primary Examiner* — Syed Haider
(74) *Attorney, Agent, or Firm* — J.C. Patents

(57) ABSTRACT

A packaged circuit including a digital controller, a port physical layer and a digital coding circuit is provided. The digital controller outputs digital data in parallel via a parallel data channel, and the digital data includes a plurality of data bits. The port physical layer includes a clock generator, and outputs a data signal according to the data bits. The clock generator outputs a clock signal to the digital controller. The digital coding circuit is coupled to the digital controller and the port physical layer, and receives the digital data and the clock signal. The digital coding circuit codes the clock signal to generate a plurality of clock bits, and outputs the clock bits to the port physical layer. The port physical layer converts the clock bits into an output clock and outputs the output clock.

24 Claims, 19 Drawing Sheets

PACKAGED CIRCUIT

CROSS-REFERENCE TO RELATED APPLICATION

This application claims the priority benefits of Chinese application serial no. 201610688892.8, filed on Aug. 19, 2016, and Chinese application serial no. 201710265003.1, filed on Apr. 21, 2017 and Chinese application serial no. 201710623594.5, filed on Jul. 27, 2017. The entirety of each of the above-mentioned patent applications is hereby incorporated by reference herein and made a part of this specification.

BACKGROUND OF THE INVENTION

1. Field of the Invention

The invention relates to a packaged circuit, and more particularly, relates to a packaged circuit capable of adjusting a sequence of output signals in response to different packaging techniques.

2. Description of Related Art

During an integrated circuit (IC) manufacturing process, a die is completed after going through steps including wafer fabrication, IC formation and wafer sawing. The die formed by cutting the wafer may be electrically connected to a package substrate by different packaging techniques, such as wire bonding or flip chip bonding, so that die-pads of the die can be electrically connected to the substrate for forming a chip. In general, the circuit is designed by the designers based on the predetermined packaging technique, and the layout on a printed circuit board (PCB) may be considered according to the design rule, layout guide, and the disposition of the die and other electronic components.

Based on different packaging techniques, the active surface of the die can be disposed facing up or down on the substrate. As such, the sequence of output signals of the chip may be in a reversed arrangement due to the different packaging techniques. For instance, FIG. 1A illustrates a schematic diagram of a sequence of output signals of the die which packaged by utilizing the wire bonding technique. FIG. 1B illustrates a schematic diagram of a sequence of output signals of the die which packaged by utilizing the flip chip bonding technique. First, with reference to FIG. 1A, a die 110 outputs signals P1 to P4 to a connector 130, and the die 110 and the connector 130 are disposed on a PCB 140. Printed electrical paths 141 to 144 on the PCB 140 are configured to transfer the signals P1 to P4 to the connector 130 which mechanism has been defined, so that output signals S1 to S4 in a fixed sequence can be outputted by the connector 130 based on a specification standard.

Referring to FIG. 1A and FIG. 1B, in the embodiment shown in FIG. 1B, a die 120 packaged by utilizing the flip chip bonding technique also outputs the signals P1 to P4 to the connector 130, and the die 120 and the connector 130 are disposed on the PCB 140. Due to the different packaging technique, the active surface of the flip chip bonding technique is facing down and the active surface of the wire bonding technique is facing up, and the sequences of the output signals P1 to P4 of the die 110 and the die 120 are reverse to each other. Based on that, when the die 120 is disposed on the PCB 140, given that a signal specification of the connector 130 remains fixed and defined, the layout of the PCB 140 must be changed to fulfill the signal specification of the connector 130. In other words, the printed electrical paths 145-148 on the PCB 140 shown in FIG. 1B must be designed differently from the printed electrical paths 141 to 144 shown in FIG. 1A so as the signals S1 to S4 can be outputted by the connector in the state compatible with its specification standard.

However, in the high speed signal application, the layout on the PCB cannot be changed rashly and should be compatible with the specified specification, or else the signal quality is reduced and becomes unacceptable. In the conventional art, circuit designers may design variety circuits for different packaging techniques, such approach leads to a significant increase in manufacturing costs for the die. In view of the above, how to design a die capable of simultaneously utilizing the different packaging techniques without changing the circuit layout on the printed circuit board is indeed one of most important issues to be addressed by persons skilled in the art.

SUMMARY OF THE INVENTION

Accordingly, the invention is directed to a packaged circuit capable of adjusting a sequence of output signals of the chip according to different packaging techniques so it is not necessary to adjust the circuit layout of the printing circuit board due to the changed packaging technique.

The invention proposes a packaged circuit, which includes a digital controller, a port physical layer and a digital coding circuit. The digital controller outputs digital data in parallel via a parallel data channel, and the digital data includes a plurality of data bits. The port physical layer includes a clock generator, and outputs a data signal according to the data bits. The clock generator outputs a clock signal to the digital controller. The digital coding circuit is coupled between the digital controller and the port physical layer, and receives the digital data and the clock signal. The digital coding circuit generates a plurality of clock bits, and outputs the clock bits to the port physical layer. The port physical layer converts the clock bits into an output clock and outputs the output clock.

The invention proposes a packaged circuit, which includes a digital controller, a port physical layer and a digital coding circuit. The digital controller outputs digital data in parallel via a parallel data channel, and the digital data includes a plurality of data bits. The port physical layer is connected to a connector, includes a clock generator, and outputs a data signal to the connector according to the data bits. The clock generator outputs a clock signal to the digital controller. The digital coding circuit is coupled to the digital controller and the port physical layer, and receives the digital data and the clock signal. The digital coding circuit generates a plurality of clock bits, and outputs the clock bits to the port physical layer. The port physical layer converts the clock bits into an output clock and outputs the output clock. Further, the digital coding circuit outputs the clock bits to a first output-port-circuit or a second output-port-circuit of the port physical layer according to a plug-in state of an external connector plugged in the connector.

Based on the above, by digital coding the clock signal generated by the port physical layer, the packaged circuit of the invention can output the coded output clock according to the clock bits. Accordingly, by changing the outputting paths for outputting the data bits and the clock bits to the port physical layer, the packaged circuit of the invention can conduct packaging by utilizing the different packaging techniques without changing the layout of the printed circuit board or re-designing the on-die circuits, and will still be compatible with other electronic components on the printed circuit board when the packaging technique is changed. In addition, the packaged circuit of the invention can change the outputting paths for outputting the data bits and the clock bits to the port physical layer according to the plug-in state of the external connector. As a result, regardless of whether the external connector is plugged in the connector in non-flipped plug-in or flipped plug-in manners, the packaged circuit of the invention can correctly transfer the signals compatible with the interface standard specification to the external connector.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
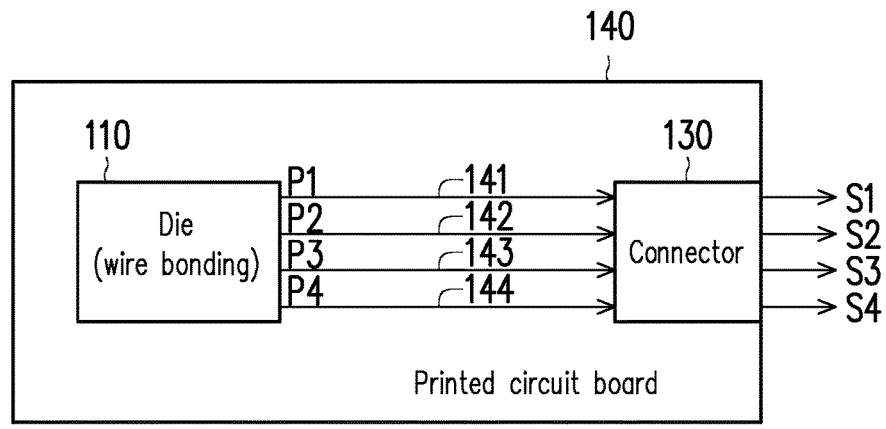
FIG. 1A illustrates a schematic diagram of a sequence of output signals of the die packaged by utilizing the wire bonding.
Figure 1B:
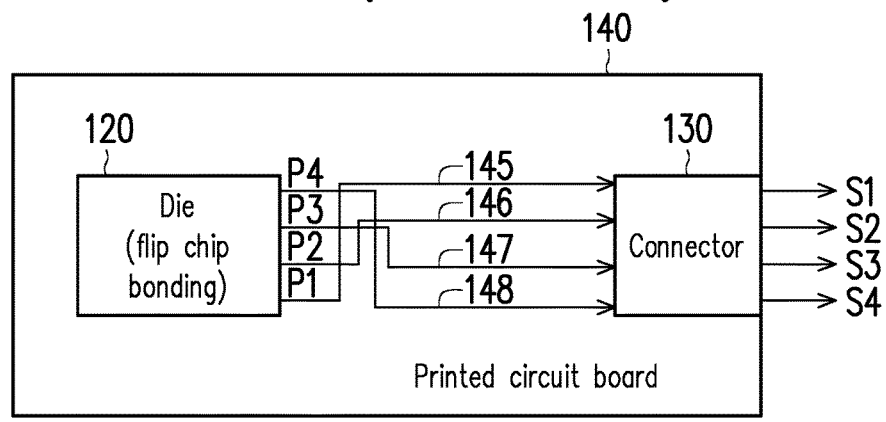
FIG. 1B illustrates a schematic diagram of a sequence of output signals of the die packaged by utilizing the flip chip bonding.

Reference will now be made in detail to the present preferred embodiments of the invention, examples of which are illustrated in the accompanying drawings. Wherever possible, the same reference numbers are used in the drawings and the description to refer to the same or like parts.

Figure 2:
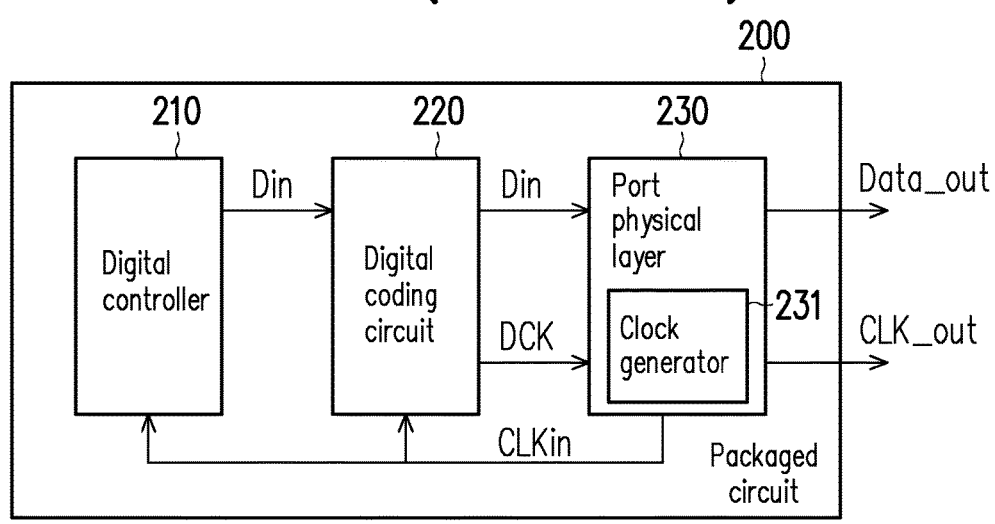
FIG. 2 is a block diagram illustrating a packaged circuit according to an embodiment of the invention.

FIG. 2 is a block diagram illustrating a packaged circuit according to an embodiment of the invention. With reference to FIG. 2, one chip can be formed after packaging a packaged circuit 200, and the chip is suitable for being disposed on a printed circuit board (PCB) after packaging. For instance, through solders at the bottom of the chip, the chip having the packaged circuit 200 can be soldered onto the PCB for allowing the packaged circuit 200 to be electrically connected to other electronic components on the PCB. Aforesaid electronic components may be connectors or other chips. The packaged circuit 200 includes a digital controller 210, a port physical layer (PHY) 230 and a digital coding circuit 220.

In an embodiment, the digital controller 210 outputs digital data Din in parallel via a parallel data channel, and the digital data Din includes a plurality of data bits. For instance, the digital controller 210 can output 10 data bits of the digital data Din in parallel, but the invention is not limited thereto. The port physical layer 230 is a connection interface between the packaged circuit 200 and external electronic devices, and supports a physical layer standard of a data transmission protocol. In an embodiment, the port physical layer 230 is an analog circuit, and outputs a data signal Data_out according to the data bits of the digital data Din. The port physical layer 230 includes a clock generator 231, and the clock generator 231 outputs a clock signal CLKin to the digital controller 210 and the digital coding circuit 220. The clock generator 231 is, for example, a phase locked loop (PLL) clock generator, but the invention is not limited thereto.

The digital coding circuit 220 is coupled between the digital controller 210 and the port physical layer 230, and receives the digital data Din and the clock signal CLKin. The digital coding circuit 220 generates and outputs a plurality of clock bits DCK to the port physical layer 230 in parallel. In an embodiment, the digital coding circuit 220 can include one of an analog-to-digital converter (ADC), a comparator and a logical gate circuit, or a combination thereof, which are not particularly limited by the invention. The port physical layer 230 converts the clock bits DCK into an output clock CLK_out for outputting. In addition, it should be noted that, the digital coding circuit 220 can generate the corresponding clock bits DCK according to the physical layer standard of the data transmission protocol supported by the port physical layer 230, so that the port physical layer 230 can output the output clock CLK_out which is compatible with the data transmission protocol according to the corresponding clock bits DCK.

Figure 3A:
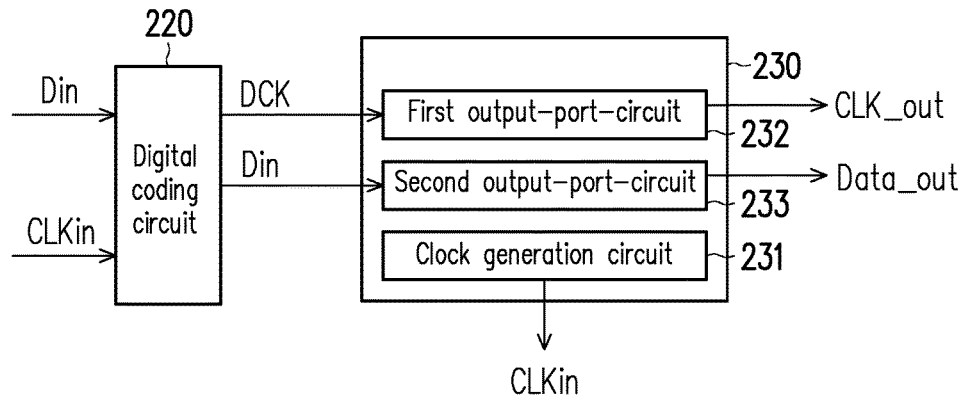
FIG. 3A and FIG. 3B are block diagrams illustrating the port physical layer according to the embodiment of FIG. 2.
Figure 3B:
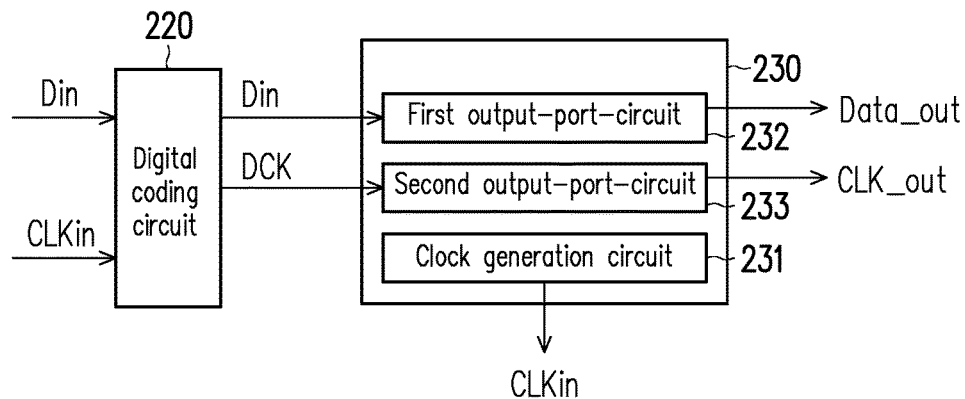

In more details, FIG. 3A and FIG. 3B are block diagrams illustrating the port physical layer according to the embodiment of FIG. 2. Referring to FIG. 3A and FIG. 3B, the port physical layer 230 includes a first output-port-circuit 232 and a second output-port-circuit 223. The digital coding circuit 220 outputs the clock bits DCK to the first output-port-circuit 232 or the second output-port-circuit 233 of the port physical layer 230 according to an operating state of the packaged circuit 200. The operating state of the packaged circuit 200 is determined according to a packaging technique implemented on the packaged circuit 200.

Furthermore, a die body of the packaged circuit 200 has an active surface, and a plurality of die pads are disposed on the active surface of the die body so as to be outwardly and electrically connected to a substrate via the die pads. If the packaged circuit 200 is packaged by a first packaging technique (e.g., by wire bonding), the active surface of the die body of the packaged circuit 200 faces up, and the packaged circuit 200 operates in a first operating state of the operating state. If the packaged circuit 200 is packaged by a second packaging technique (e.g., flip chip), the active surface of the die body of the packaged circuit 200 faces down, and the packaged circuit 200 operates in a second operating state of the operating state.

In an embodiment, the digital coding circuit 220 may learn whether the packaged circuit operates in the first operating state or the second operating state based on an input signal. With reference to FIG. 3A, in response to the packaged circuit 200 operating in the first operating state, the digital coding circuit 220 outputs the clock bits DCK which is generated based on the data transmission protocol to the first output-port-circuit 232 of the port physical layer 230. When the digital coding circuit 220 outputs the clock bits DCK to the first output-port-circuit 232, the digital coding circuit 220 outputs the data bits of the digital data Din to the second output-port-circuit 233. In this way, the first output-port-circuit 232 can accordingly output the output clock CLK_out, and the second output-port-circuit 233 can accordingly output the data signal Data_out.

With reference to FIG. 3B, in response to the packaged circuit 200 operating in the second operating state, the digital coding circuit 220 outputs the clock bits DCK generated based on the data transmission protocol to the second output-port-circuit 233 of the port physical layer 230. When the digital coding circuit 220 outputs the clock bits DCK to the second output-port-circuit 233, the digital coding circuit 220 outputs the data bits of the digital data Din to the first output-port-circuit 232. In this way, the first output-port-circuit 232 can accordingly output the data signal Data_out, and the second output-port-circuit 233 can accordingly output the output clock CLK_out.

In view of the above, because the output signals (i.e., CLK_out and Data_out) of the first output-port-circuit 232 and the second output-port-circuit 233 of the packaged circuit 200 are swappable, no matter whether the active surface of the die body of the packaged circuit 200 faces up or down, the packaged circuit 200 can be correctly and electrically connected to the other electronic components to output the output clock CLK_out compatible with the data transmission protocol without changing the layout of the PCB.

Figure 4:
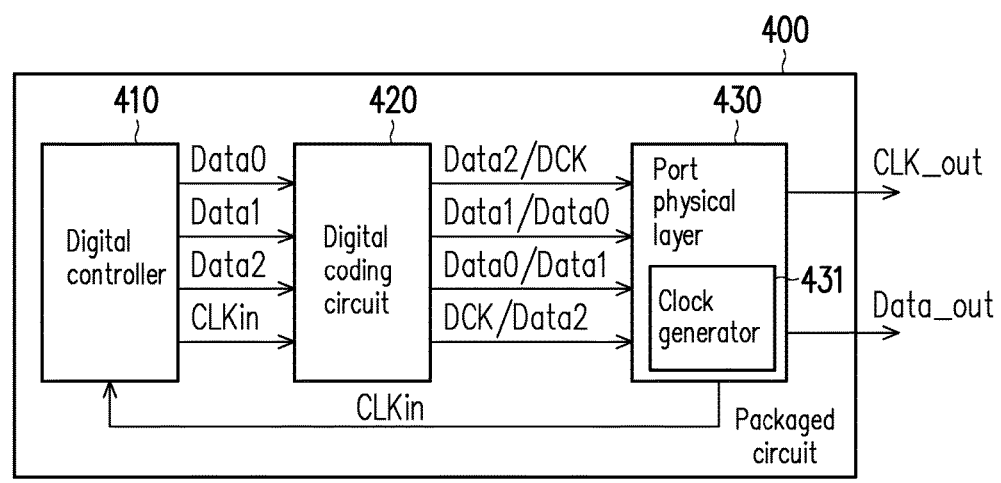
FIG. 4 is a block diagram illustrating a packaged circuit according to an embodiment of the invention.

FIG. 4 is a block diagram illustrating a packaged circuit according to an embodiment of the invention. In the present embodiment, a packaged circuit 400 includes a digital controller 410, a port physical layer (PHY) 430 and a digital coding circuit 420. In the present embodiment, the digital controller 410 outputs a plurality of digital data Data0, Data1 and Data2 respectively in parallel via a parallel data channel, and each of the digital data Data0, Data1 and Data2 includes a plurality of data bits. Hereinafter, description is provided with an example in which the first packaging technique is the wire bonding and the second packaging technique is the flip chip, but the invention is not limited thereto.

The port physical layer 430 is a connection interface between the packaged circuit 400 and external electronic components, and the port physical layer 430 supports, for example, a physical layer standard of High Definition Multimedia Interface (HDMI). The port physical layer 430 can output a data signal Data_out composed of multiple pairs of differential signal according to the data bits of the digital data Data0, Data1 and Data2. The port physical layer 430 includes a clock generator 431, and the clock generator 431 outputs a clock signal CLKin to the digital controller 410.

The digital coding circuit 420 is coupled between the digital controller 410 and the port physical layer 430, and receives the digital data Data0, Data1 and Data2 and the clock signal CLKin. The digital coding circuit 420 generates a plurality of clock bits DCK, and outputs the clock bits DCK to the port physical layer 430 in parallel. The port physical layer 430 converts the clock bits DCK into an output clock CLK_out which is an analog signal for outputting.

It is noted that, in addition to the fact that the digital coding circuit 420 generates the clock bits DCK, because the packaged circuit 400 of the present embodiment outputs the multiple pairs of differential signal corresponding to the digital data Data0, Data1 and Data2, the digital coding circuit 420 can further adjust an outputting sequence and a polarity "negative-positive" of the digital data Data0, Data1 and Data2 according to an operating state of the packaged circuit 400. As similar to the above, the operating state of the packaged circuit 400 is determined according to its packaging technique. In an embodiment, the digital coding circuit 420 may include, for example, a multiplexer or a switch, so as to output the data bits of the digital data Data0, Data1 and Data2 and the clock bits DCK to the corresponding output-port-circuits.

Figure 5:
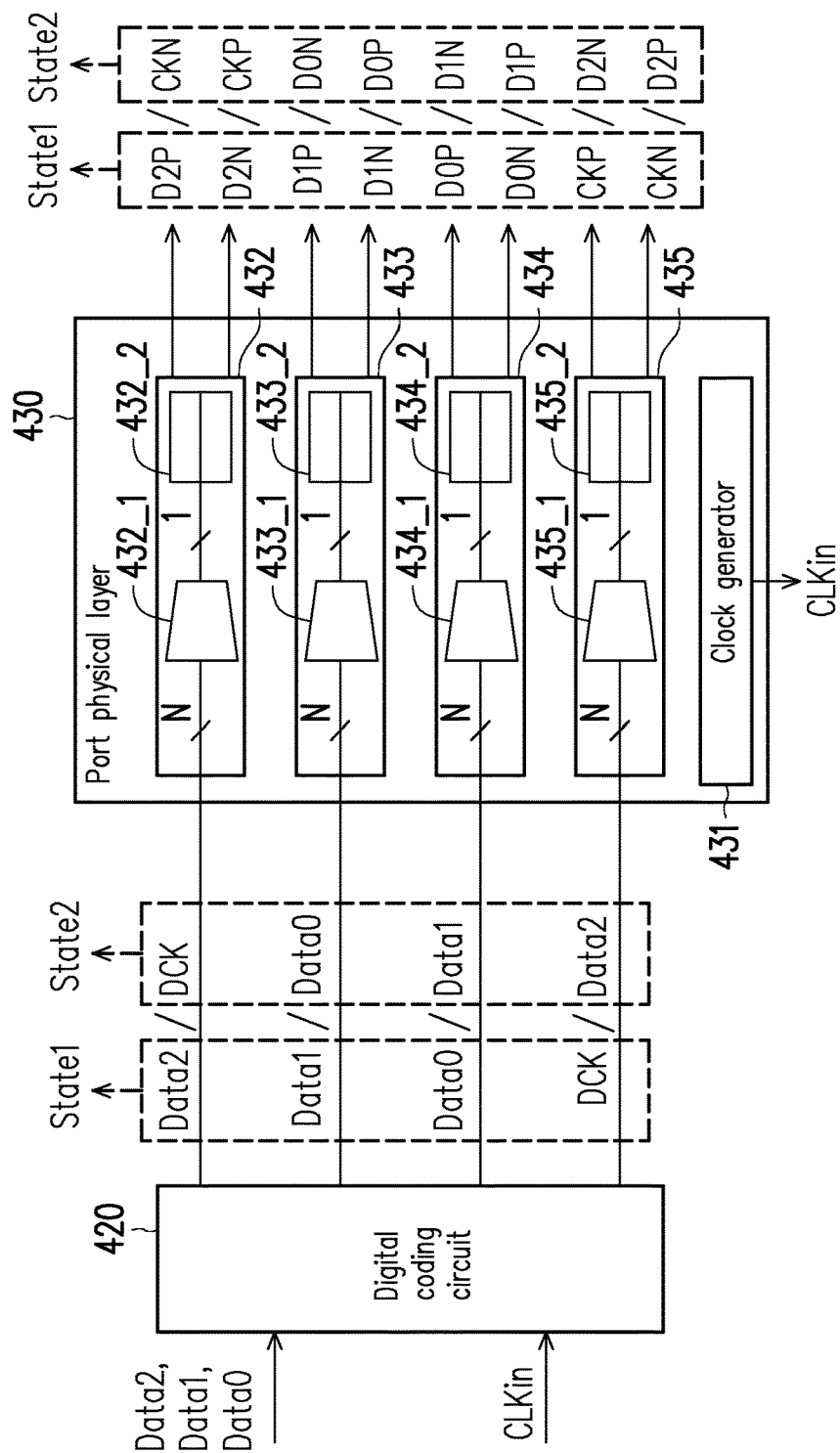
FIG. 5 is a block diagram illustrating the port physical layer according to the embodiment of FIG. 4.

In detail, FIG. 5 is a block diagram illustrating the port physical layer according to the embodiment of FIG. 4. With reference to FIG. 5, the port physical layer 430 includes a first output-port-circuit 432, a second output-port-circuit 435, a third output-port-circuit 433 and a fourth output-port-circuit 434. The first output-port-circuit 432 includes a first serializer 432_1 and a first port-driving-circuit 432_2 coupled to each other; the second output-port-circuit 435 includes a second serializer 435_1 and a second port-driving-circuit 435_2 coupled to each other; the third output-port-circuit 433 includes a third serializer 433_1 and a third port-driving-circuit 433_2 coupled to each other; the fourth output-port-circuit 434 includes a fourth serializer 434_1 and a fourth port-driving-circuit 434_2 coupled to each other.

The first serializer 432_1 can convert data bits of the digital data Data2 or the clock bits DCK from parallel to series. The first port-driving-circuit 432_2 is configured to receive the data bits or the clock bits in series so as to output data signals D2P/D2N or output clocks CKN/CKP which are differential pair signals.

Similarly, the second serializer 435_1 can convert one of the data bits of the data bits Data2 and the clock bits DCK from parallel to series. The second port-driving-circuit 435_2 is configured to receive the data bits or the clock bits in series so as to output the data signals D2P/D2N or the output clocks CKN/CKP.

As shown in FIG. 5, when the packaged circuit 400 operates in a first operating state (State1), the first serializer 432_1 can convert the data bits of the digital data Data2 from parallel to serial for outputting, and the first port-driving-circuit 432_2 outputs the data signals D2P/D2N. On the other hand, when the packaged circuit 400 operates in a second operating state (State2), the first serializer 432_1 can convert the clock bits DCK from parallel to serial for outputting, and the first port-driving-circuit 432_2 outputs the output clocks CKN/CKP.

Similarly, when the packaged circuit 400 operates in the first operating state (State1), the second serializer 435_1 can convert the clock bits DCK from parallel to serial for outputting, and the second port-driving-circuit 435_2 outputs the output clocks CKP/CKN. On the other hand, when the packaged circuit 400 operates in the second operating state (State2), the second serializer 435_1 can convert the data bits of the digital data Data2 from parallel to serial for outputting, and the second port-driving-circuit 435_2 outputs the data signals D2N/D2P.

When the packaged circuit 400 operates in the first operating state (State1), the third serializer 433_1 can convert the data bits of the digital data Data1 from parallel to serial for outputting, and the third port-driving-circuit 433_2 outputs the data signals D1P/D1N which are differential pair signals. On the other hand, when the packaged circuit 400 operates in the second operating state State2, the third serializer 433_1 can convert the data bits of the digital data Data0 from parallel to serial for outputting, and the third port-driving-circuit 433_2 outputs data signals D0N/D0P which are differential pair signals.

When the packaged circuit 400 operates in the first operating state (State1), the fourth serializer 434_1 can convert the data bits of the digital data Data0 from parallel to serial for outputting, and the fourth port-driving-circuit 434_2 outputs the data signals D0P/D0N. On the other hand, when the packaged circuit 400 operates in the second operating state State2, the fourth serializer 434_1 can convert the data bits of the digital data Data1 from parallel to serial for outputting, and the fourth port-driving-circuit 434_2 outputs the data signals D1N/D1P.

It is noted that, given that a positive output and a negative output of a connector connected to the packaged circuit are determined, apart from adjusting outputting paths for the data bits and the clock bits according to the packaging technique of the packaged circuit, the invention is also capable of determining outputting paths for positive signals and negative signals among the differential pair signals according to the packaging technique of the packaged circuit.

Accordingly, by additionally deploying the digital coding circuit for outputting the clock bits and self-generating the clock bits based on the data transmission protocol, the invention can determine the output signal of a die pad on the die body to be one of the output clock or the data signals in response to the packaged circuit operating in the different states. Resultantly, regardless of whether the die body of the packaged circuit has the active surface facing up or down, the packaged circuit of the invention can output the output clock and the data signals to the predetermined contacts on the PCB with determined layout.

Figure 6:
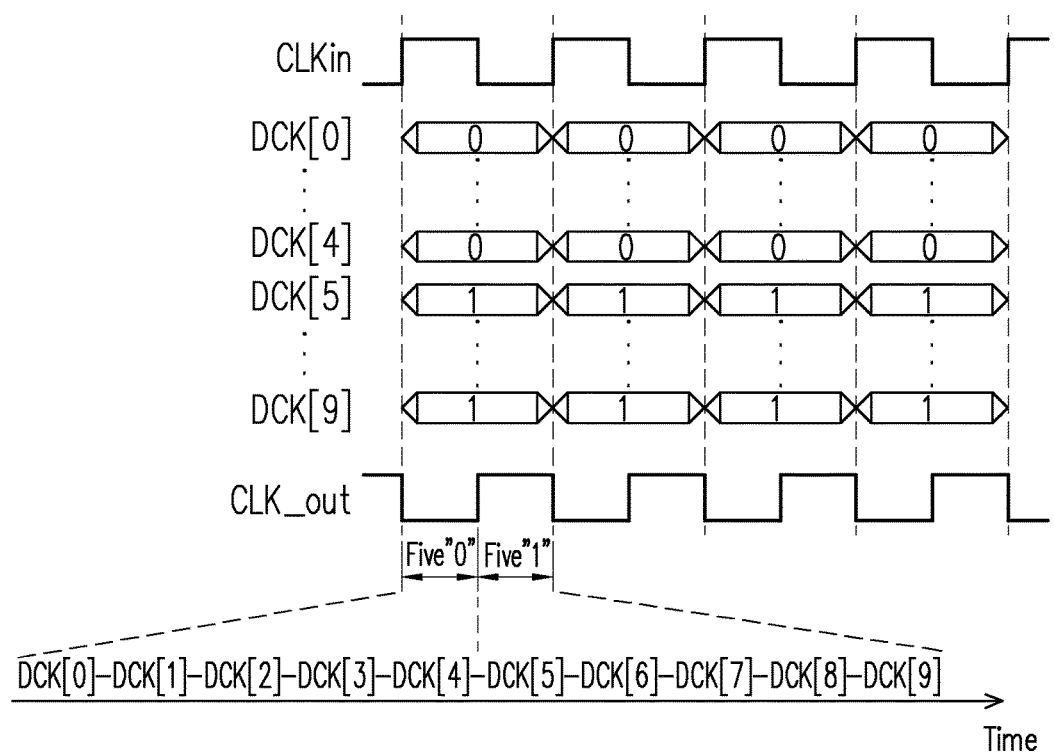
FIG. 6 illustrates a schematic signal diagram of a clock signal coded for generating clock bits according to an embodiment of the invention.

FIG. 6 illustrates a schematic signal diagram for generating clock bits according to an embodiment of the invention. With reference to FIG. 6, a digital coding circuit of the invention receives a clock signal CLKin and generates 10-bit clock bits DCK[0] to DCK[9]. However, the invention is not intended to limit the number of bits and bit values for the clock bits, which may be determined according to actual requirements and applications. In the example of FIG. 6, the bit values of the clock bits DCK[0], DCK[1], DCK[2], DCK[3] and DCK[4] are configured as '0' and the bit values of the clock bits DCK[5], DCK[6], DCK[7], DCK[8] and DCK[9] are configured as '1'.

As such, one of a plurality of output-port-circuits of a port physical layer receives the clock bits DCK[0] to DCK[9] in parallel, and outputs the clock bits DCK[0] to DCK[9] in series to generate an output clock CLK_out. Furthermore, within one clock cycle of the clock signal CLKin, the clock signals DCK[0] to DCK[9] are outputted one by one in series to generate the output clock CLK_out. In the embodiment of FIG. 6, a frequency of the clock signal CLKin is identical to a frequency of the output clock CLK_out.

Nonetheless, according to settings on the bit values for the clock bits, the frequency of the clock signal may be different from the frequency of the output clock. For instance, if the bit values of the clock bits DCK[0], DCK[2], DCK[4], DCK[6] and DCK[8] are configured as '0' and the bit values of the clock bits DCK[1], DCK[3], DCK[5], DCK[7] and DCK[9] are configured as '1', the frequency of the clock signal CLKin is one tenth the frequency of the output clock CLK_out.

It should be noted that, the packaged circuit of the invention can determine to output or not to output an output clock to an external connector depending on a transmission interface standard used by the digital controller. That is to say, with the same circuit scheme, the digital coding circuit of the invention can output or not to output the clock bits depending on the transmission interface standard used by the digital controller. In other words, when a transmission channel defined by a first transmission interface standard includes a clock channel, one of the port-driving-circuits is configured to generate an output clock compatible with the first transmission interface standard according to the clock bits, and the rest of port-driving-circuits are configured to generate data signals compatible with the first transmission interface standard according to the data bits. On the other hand, when a transmission channel defined by a second transmission interface standard does not include the clock channel, each of the port-driving-circuits is configured to generate a data signal compatible with the second transmission interface standard according to the data bits. The first transmission interface standard is, for example, HDMI standard version 1.4 or version 2.0, and the second transmission interface standard is, for example, HDMI standard version 2.1.

Specifically, the embodiments of FIG. 3A to FIG. 5 are applied in the case where the digital controller generates the digital data according to the first transmission interface standard so the port physical layer can output the data signals and the output clock compatible with the first transmission interface standard. Referring to FIG. 4 and FIG. 5, when the digital controller 410 generates the digital data Data0, Data1 and Data2 corresponding to three data channels according to the first transmission interface standard, the digital coding circuit 420 outputs the clock bits DCK to the first port-driving-circuit 432 of the port physical layer 430 (assuming that it operates in the second operating state (State2)) according to the clock signal CLKin, and the first port-driving-circuit 432 outputs the output clock CLK_out in response to the clock bits DCK so that the port physical layer 430 outputs the output clock CLK_out (i.e., the output clocks CKN/CKP) and the data signal Data_out (i.e., the data signals D2P/D2N, D1P/D1N and D0P/D0N) compatible with the first signal transmission standard.

Figure 7:
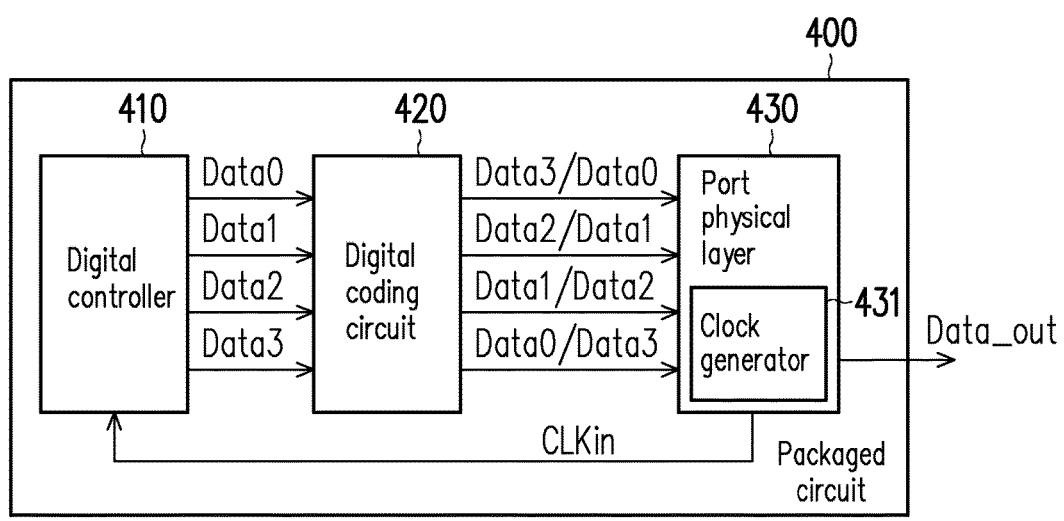
FIG. 7 is a block diagram illustrating a packaged circuit according to an embodiment of the invention.

Hereinafter, an example is further provided regarding how the port physical layer outputs the data signal compatible with the second transmission interface standard only without outputting any output clock when the digital controller generates the digital data according to the second transmission interface standard. FIG. 7 is a block diagram illustrating a packaged circuit according to an embodiment of the invention. In the present embodiment, a packaged circuit 400 includes a digital controller 410, a port physical layer (PHY) 430 and a digital coding circuit 420. Coupling relations for each circuit element in FIG. 7 are similar to those in the embodiment of FIG. 4, and description regarding each circuit element can refer to the foregoing embodiments.

In the embodiment of FIG. 7, when the digital controller 410 generates digital data Data0, Data1, Data2 and Data3 corresponding to four digital channels according to the second transmission interface standard, the digital controller 410 outputs the digital data Data0, Data1, Data2 and Data3 in parallel via a parallel data channel. Herein, each of the digital data Data0, Data1, Data2 and Data3 includes a plurality of data bits. The digital coding circuit 420 receives the digital data Data0, Data1, Data2 and Data3. The digital coding circuit 420 does not generate a plurality of clock bits. The port physical layer 430 can output a data signal Data_out which is composed of multiple pairs of differential signal and compatible with a second signal transmission standard according to the data bits of the digital data Data0, Data1, Data2 and Data3. Also, the port physical layer 430 does not output the output clock.

Figure 8:
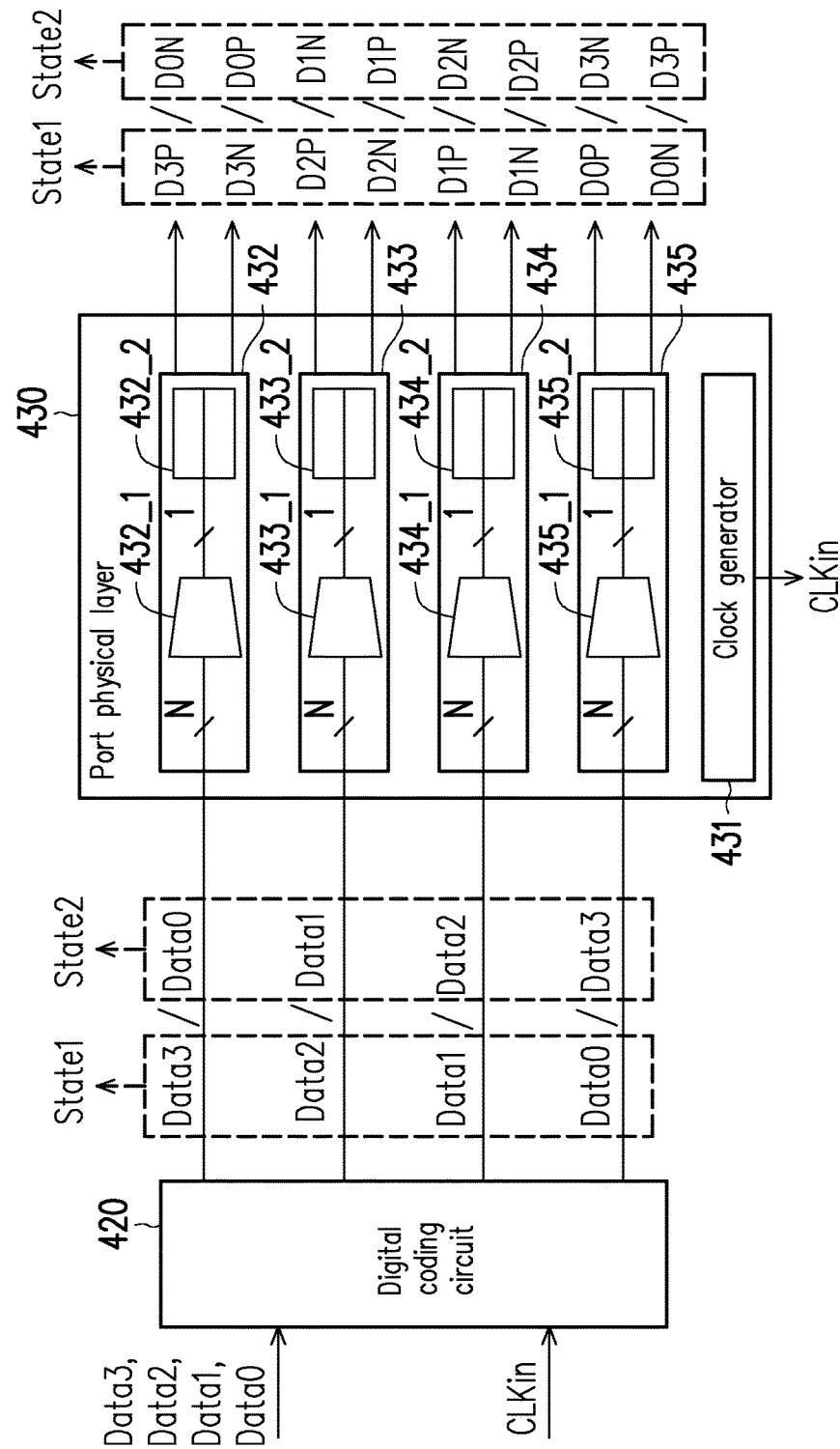
FIG. 8 is a block diagram illustrating the port physical layer according to the embodiment of FIG. 4.

In detail, FIG. 8 is a block diagram illustrating the port physical layer according to the embodiment of FIG. 7. With reference to FIG. 8, the port physical layer 430 includes a first output-port-circuit 432, a second output-port-circuit 435, a third output-port-circuit 433 and a fourth output-port-circuit 434. Their coupling relations and internal components are similar to those in FIG. 5 and therefore refer to the description of FIG. 5. It should be noted that, in the embodiment of FIG. 8, the digital coding circuit 420 receives the digital data Data0, Data1, Data2 and Data3 without outputting the clock bits.

Therefore, in correspondence to the packaged circuit 400 operating in the first operating state (State1) or the second operating state (State2), the first output-port-circuit 432 converts the data bits of the digital data Data3 the digital data Data0 from parallel to series, and then output data signals D3P/D3N or D0P/D0N.

In correspondence to the packaged circuit 400 operating in the first operating state (State1) or the second operating state (State2), the second output-port-circuit 435 converts the data bits of the digital data Data3 or the digital data Data0 from parallel to series, and then output the data signals D0P/D0N or D3P/D3N.

In correspondence to the packaged circuit 400 operating in the first operating state (State1) or the second operating state (State2), the third output-port-circuit 433 converts the data bits of the digital data Data2 or the digital data Data1 from parallel to series, and then output the data signals D2P/D2N or D1P/D1N. Similarly, in correspondence to the packaged circuit 400 operating in the first operating state (State1) or the second operating state (State2), the fourth output-port-circuit 434 converts the data bits of the digital data Data2 or the digital data Data1 from parallel to series, and then output the data signals D1P/D1N or D2P/D2N.

Please refer to FIG. 5 and FIG. 8, when the digital controller 410 shown in FIG. 5 generates the digital data Data0, Data1 and Data2 corresponding to three data channels according to the first transmission interface standard and the packaged circuit 400 operates in a second operating state (State 2), the first output-port-circuit 432 generates the output clocks CKN/CKP according to the clock bits DCK. When the digital controller 410 shown in FIG. 8 generates the digital data Data0, Data1, Data2 and Data3 corresponding to four data channels according to the second transmission interface standard and the packaged circuit 400 operates in the second operating state (State 2), the first output-port-circuit 432 generates the data signals D0N/D0P according to the data bits of the digital data Data0. In other words, the first output-port-circuit 432 can correspondingly output the data signals D0N/D0P or the output clocks CKN/CKP in response to the different transmission interface standards used by the digital controller 410.

Similarly, when the digital controller 410 shown in FIG. 5 generates the digital data Data0, Data1 and Data2 corresponding to three data channels according to the first transmission interface standard and the packaged circuit 400 operates in a first operating state (State 1), the second output-port-circuit 435 generates the output clocks CKP/CKN according to the clock bits DCK. When the digital controller 410 shown in FIG. 8 generates the digital data Data0, Data1, Data2 and Data3 corresponding to four data channels according to the second transmission interface standard and the packaged circuit 400 operates in the first operating state (State 1), the second output-port-circuit 435 generates the data signals D0N/D0P according to the data bits of the digital data Data0. In other words, the second output-port-circuit 435 can correspondingly output the data signals D0N/D0P or the output clocks CKN/CKP in response to the different transmission interface standards used by the digital controller 410.

In this way, the invention allows the port physical layer to be compatible with the different two transmission interface standards (e.g., HDMI standard version 2.0 and HDMI standard version 2.1). In response to the digital controller which applies the first transmission interface standard having the clock channel, the packaged circuit of the invention can output both the output clock and the data signals to the predetermined contacts on the PCB with determined routing layout. In response to the digital controller which applies the second transmission interface standard not having the clock channel, the packaged circuit of the invention can output the data signals to the predetermined contacts on the PCB with determined layout.

It is noted that, it is already clearly illustrated that the packaged circuit can determine the outputting paths for outputting the data bits and the clock bits to the port physical layer according to the packaging technique in the embodiments of FIG. 3A to FIG. 5, but the invention is not limited thereto. In another embodiment, because the digital coding circuit of the packaged circuit is capable of coding the clock signal into the clock bits and adjusting transmission paths for the clock bits and the data bits, the packaged circuit can also determine the outputting paths for outputting the data bits and the clock bits to the port physical layer according to a plug-in state of an external controller. Details regarding the above will be described with reference to the following embodiments.

Figure 9:
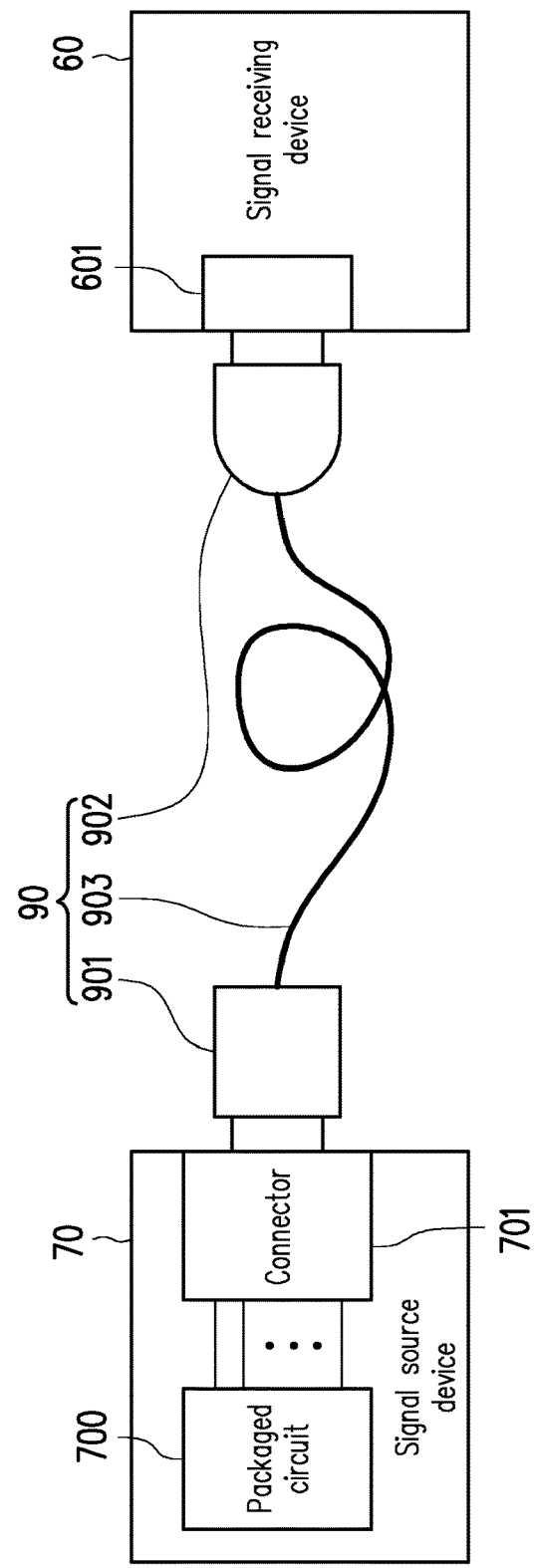
FIG. 9 is a schematic diagram illustrating a situation where a connection plug is connected to a packaged circuit with a bidirectional plug-in function via a connection socket according to an embodiment of the invention.

FIG. 9 is a schematic diagram illustrating a situation where a connection plug is connected to a packaged circuit with a bidirectional plug-in function via a connection socket according to an embodiment of the invention. With reference to FIG. 9, a signal source device 70 is connected to a signal receiving device 60 through a signal transmission cable 90 so as to provide signals to the signal receiving device 60. For instance, the signal source device 70 may be a Set-Top Box (STB) and the signal receiving device 60 may be a display. In one embodiment, the STB can transmit video signals through the signal transmission cable 90 (i.e., an image transmission cable) to be played on the display, but the invention is not limited thereto. The signal transmission cable 90 includes a first plug 901, a second plug 902 and a transmission cable 903, and the signal source 70 includes a packaged circuit 700 and a connector 701. The first plug 901 is adapted to be plugged in the connector 701 being a socket, and the second plug 902 is adapted to be plugged in a connector 601 being another socket. In this way, the packaged circuit 700 of the signal source device 70 can provide signals to the signal receiving device 60 through the first plug 901, the second plug 902 and the transmission cable 903.

It should be noted that, in an exemplary embodiment, the first plug 901 and the second plug 902 can support different transmission physical layer standards, and the transmission physical layer standard supported by the first plug 901 has the bidirectional plug-in function. For example, the transmission physical layer standard supported by the first plug 901 is USB type-C standard and the transmission physical layer standard supported by the second plug 902 is HDMI standard, but the invention is not limited thereto. In the present embodiment, because a signal type corresponding to each channel in the transmission cable 903 is determined based on the transmission physical layer standard supported by the second plug 902, for allowing the first plug 901 to correctly send each the data signals and the output clocks to each channel in the transmission cable 903 after being plugged in the connector 701 in non-flipped plug-in or flipped plug-in manners, the packaged circuit 700 can determine which one of the output-port-circuits in the port physical layer is to be used for receiving the clock bits and generating the output clock according to a plug-in state of the first plug 901 regarded the external connector.

Figure 10A:
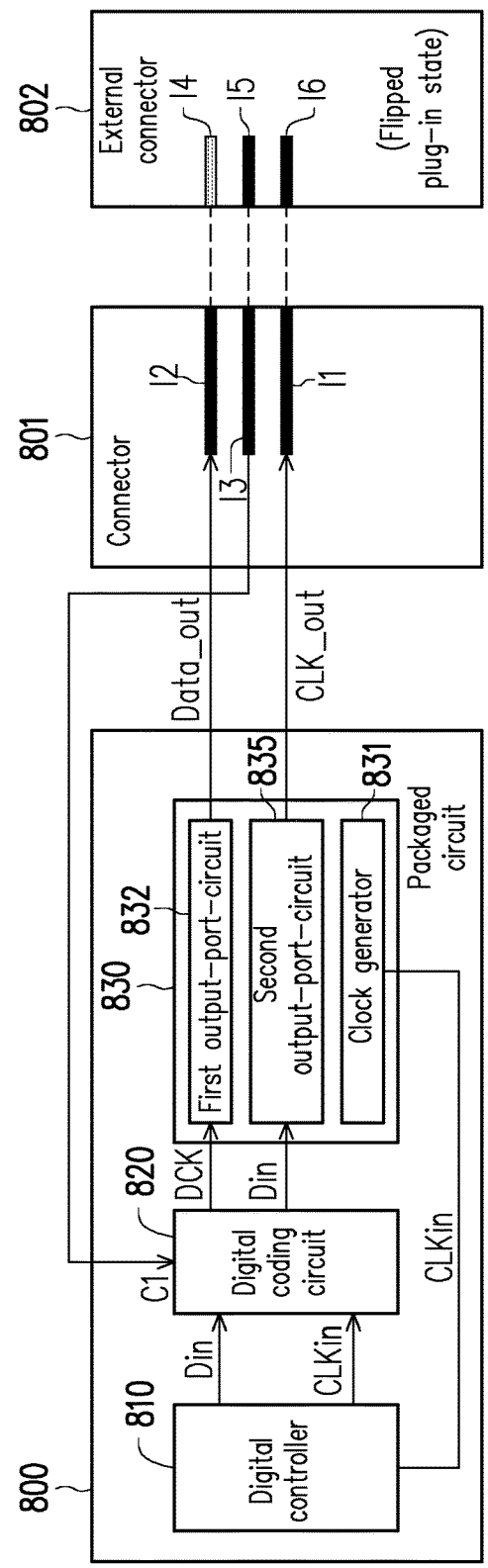
FIG. 10A and FIG. 10B are block diagrams illustrating a packaged circuit according to an embodiment of the invention.
Figure 10B:
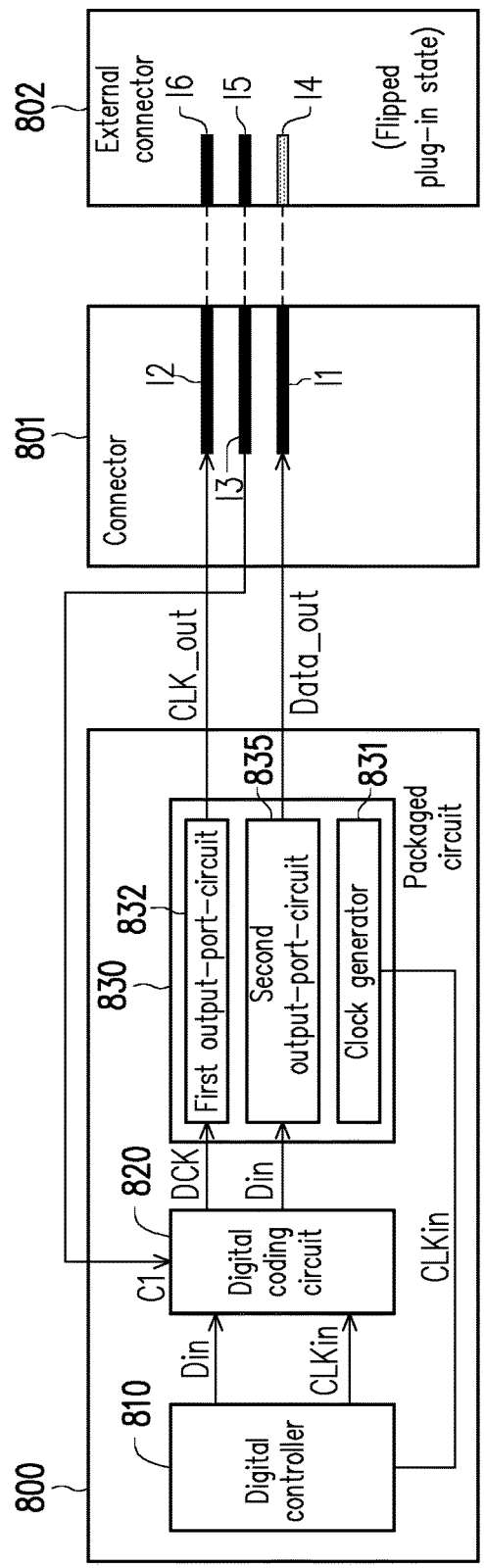

FIG. 10A and FIG. 10B are block diagrams illustrating a packaged circuit according to an embodiment of the invention. Referring to FIG. 9, FIG. 10A and FIG. 10B together, a connector 801 may be the connector 701 in the signal source device 70 depicted in FIG. 9, and an external connector 802 can be the first plug 901 of the signal transmission line 90 depicted in FIG. 9. In the present embodiment, a packaged circuit 800 includes a digital controller 810, a port physical layer 830 and a digital coding circuit 820. For illustrative convenience, referring to FIG. 10A and FIG. 10B together, the digital coding circuit 820 can output the clock bits DCK to a first output-port-circuit 832 or a second output-port-circuit 835 of the port physical layer 830 according to a plug-in state of the external connector 802 plugged in the connector 801 in the present embodiment. The plug-in state of the external connector 802 includes a non-flipped plug-in state and a flipped plug-in state.

As similar to the embodiments of FIG. 2 to FIG. 6, the digital coding circuit 820 in FIG. 10A and FIG. 10B is also capable of coding the clock signal CLKin and generating the clock bits DCK, and adapted to adjust outputting paths for outputting the data bits of the digital data Din and the clock bits DCK to the port physical layer 830. Specifically, with reference to FIG. 10A, the digital controller 810 outputs the digital data Din in parallel via a parallel data channel, and the digital data Din includes a plurality of data bits. The port physical layer 830 includes a clock generator 831, the first output-port-circuit 832 and the second output-port-circuit 835, and the port physical layer 830 is connected to the connector 801 and outputs a data signal Data_out to the connector 801 according to the data bits of the digital data Din. The digital coding circuit 820 is coupled between the digital controller 810 and the port physical layer 830, and receives the digital data Din and the clock signal CLKin. The digital coding circuit 820 generates a plurality of clock bits DCK according to the clock signal CLKin, and outputs the clock bits DCK to the port physical layer 830. The port physical layer 830 converts the clock bits DCK into an output clock CLK_out to be outputted.

In the example shown in FIG. 10A, when the external connector 802 is plugged in the connector 801 in the non-flipped plug-in state, the digital coding circuit 820 generates a plurality of clock bits DCK according to the clock signal CLKin, and outputs the clock bits DCK to the second output-port-circuit 835 of the port physical layer 830. Meanwhile, the digital coding circuit 820 outputs the data bits of the digital data Din to the first output-port-circuit 832 of the port physical layer 830. In addition, when the plug-in state is the non-flipped plug-in state, the second output-port-circuit 835 outputs the output clock CLK_out to a first data transmission pin I1 of the connector 801 in response to the clock bits DCK so the output clock CLK_out can be received by a clock transmission pin I6 of the external connector 802. Meanwhile, the first output-port-circuit 832 outputs the data signal Data_out to a second data transmission pin I2 of the connector 801 in response to the data bits of the digital data Din so the data signal Data_out can be received by a data transmission pin I4 of the external connector 802.

In the example shown in FIG. 10B, when the external connector 802 is plugged in the connector 801 in the flipped plug-in state, the digital coding circuit 820 generates a plurality of clock bits DCK according to the clock signal CLKin, and outputs the clock bits DCK to the first output-port-circuit 832 of the port physical layer 830 based on the flipped plug-in state. Meanwhile, the digital coding circuit 820 outputs the data bits of the digital data Din to the second output-port-circuit 835 of the port physical layer 830. It should be noted, operations and functions of the digital coding circuit 820 are similar to those of the digital coding circuit 220 of FIG. 2 to FIG. 3B and those of the digital coding circuit 420 of FIG. 4 and FIG. 5, and thus the operations and the functions of the digital coding circuit 820 can be derived with reference to the description for FIG. 2 to FIG. 6. In brief, the digital coding circuit 820 can include a multiplexer or a switch and receive control signals generated based on the plug-in state, so as to toggle the multiplexer or the switch based on the control signals in order to output the data bits of the digital data Din and the clock bits DCK to the corresponding output-port-circuits. In addition, when the plug-in state is the flipped plug-in state, the first output-port-circuit 832 outputs the output clock CLK_out to the second data transmission pin I2 of the connector 801 in response to the clock bits DCK so the output clock CLK_out can be received by the clock transmission pin I6 of the external connector 802. Meanwhile, the second output-port-circuit 835 outputs the data signal Data_out to the first data transmission pin I1 of the connector 801 in response to the data bits of the digital data Din so the data signal Data_out can be received by the data transmission pin I4 of the external connector 802.

In an exemplary embodiment, the digital coding circuit 820 can detect the plug-in state of the external connector 802 plugged in the connector 801 via a configuration channel pin I3 of the connector 801, and determine the outputting paths for the clock bits DCK and the data bits of the digital data Din according to a control signal C1 responding to the plug-in state. Here, the configuration channel pin I3 can generate the control signal C1 in response to a connection with a pin I5 of the external connector 802.

Figure 11A:
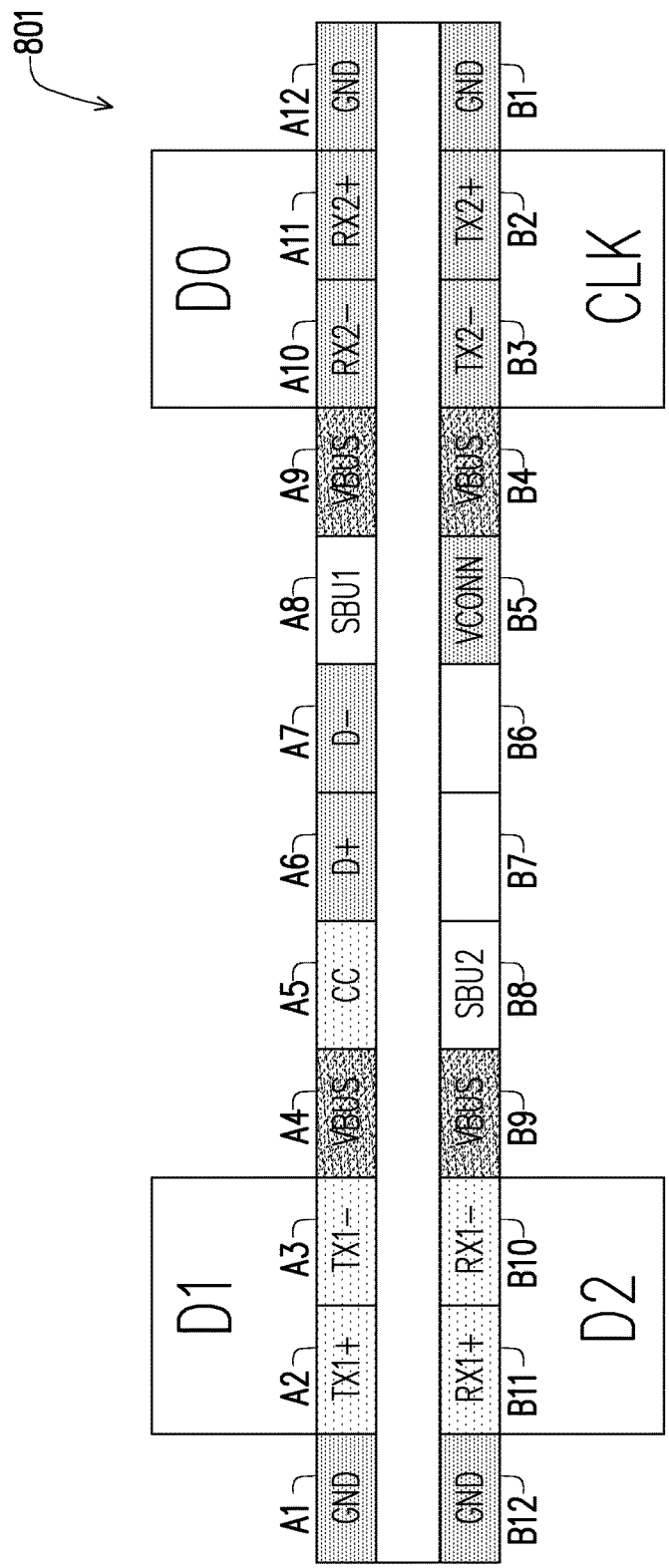
FIG. 11A and FIG. 11B are schematic diagrams illustrating disposition of connector pins and their output signals according to an embodiment of the invention.
Figure 11B:
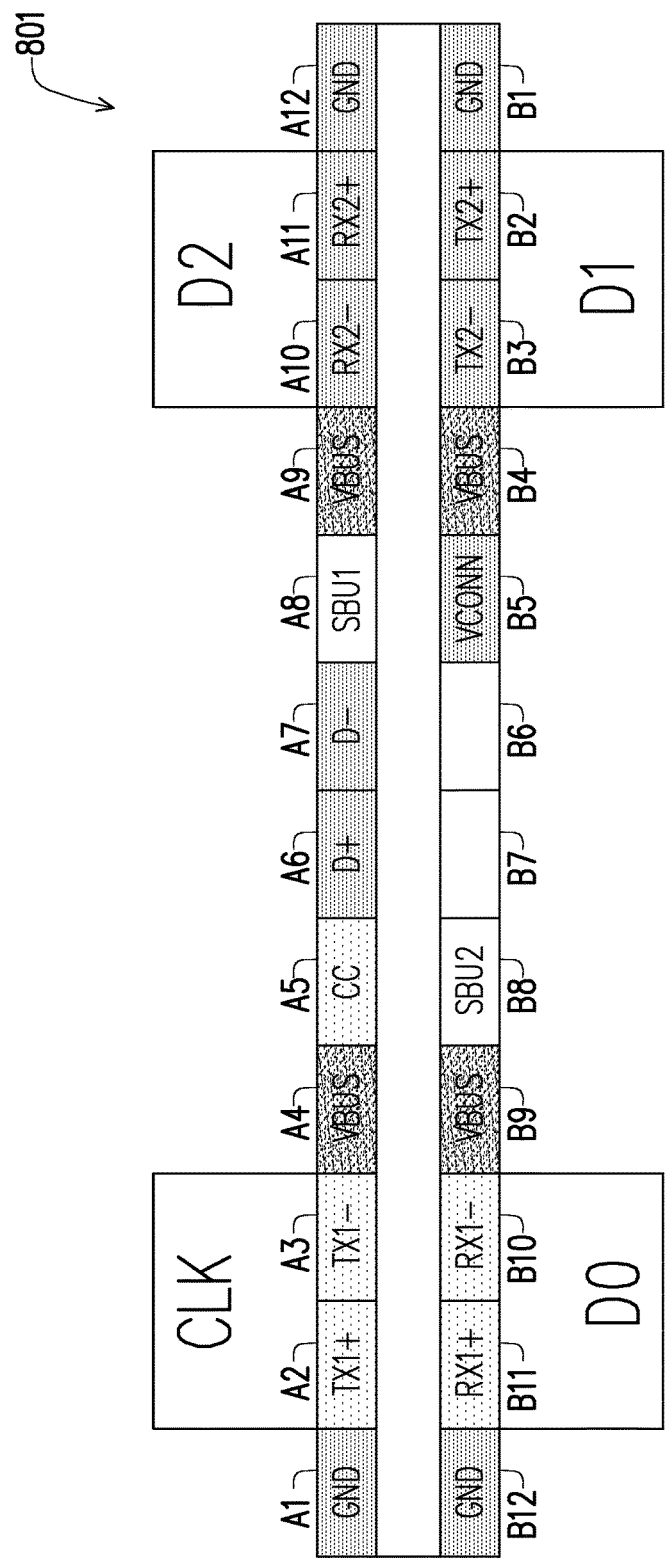

FIG. 11A and FIG. 11B are schematic diagrams illustrating disposition of connector pins and their output signals according to an embodiment of the invention. In an example where the connector 801 and the external connector 802 illustrated in FIG. 10A and FIG. 10B support USB type-C standard, the connector 801 can include 12 pins disposed on both top and bottom surfaces. Moreover, pin numbers and pin names for each pin in USB type-C standard are provided in Table 1 below.

TABLE 1

| Pin number | Pin function definition |
|---|---|
| A1 | GND |
| A2 | TX1+ |
| A3 | TX1− |
| A4 | VBUS |
| A5 | CC |
| A6 | D+ |
| A7 | D− |
| A8 | SBU1 |
| A9 | VBUS |
| A10 | RX2− |
| A11 | RX2+ |
| A12 | GND |
| B1 | GND |
| B2 | TX2+ |
| B3 | TX2− |
| B4 | VBUS |
| B5 | CC |
| B6 | D+ |
| B7 | D− |
| B8 | SBU2 |
| B9 | VBUS |
| B10 | RX1− |
| B11 | RX1+ |
| B12 | GND |

In the example of FIG. 11A and FIG. 11B, although the connector 801 and the external connector 802 support USB type C standard, but an output signal standard of the packaged circuit 800 is HDMI standard. More specifically, pins A2, A3, A10, A11, B2, B3, B10 and B11 of the connector 801 for transmitting differential pair signals can be configured to transmit a TMDS (Transition Minimized Differential Signaling) signal in HDMI standard so as to transmit HDMI format signals through the connector supporting USB type-C standard.

Accordingly, referring to Table 1, FIG. 10A and FIG. 10B, under the circumstance where the plug-in state of the external connector 802 is the non-flipped plug-in state with the configuration of the digital coding circuit 820, pins A2 and A3 of the connector 801 can be used to transmit a differential data signal pair D1 (including TMDS DATA1+ and TMDS DATA1−) defined by HDMI standard. Pins A10 and A11 of the connector 801 can be used to transmit a differential data signal pair D0 (including TMDS DATA0+ and TMDS DATA0−) defined by HDMI standard. Pins B11 and B10 of the connector 801 can be used to transmit a differential data signal pair D2 (including TMDS DATA2+ and TMDS DATA2−) defined by HDMI standard. Pins B3 and B2 of the connector 801 can be used to transmit a differential clock signal pair CLK (including TMDS Clock+ and TMDS Clock−) defined by HDMI standard.

On the other hand, referring to Table 1, FIG. 10B and FIG. 10B, under the circumstance where the plug-in state of the external connector 802 is the flipped plug-in state with the configuration of the digital coding circuit 820, pins A2 and A3 of the connector 801 can be used to transmit the differential clock signal pair CLK (including TMDS Clock+ and TMDS Clock−) defined by HDMI standard. Pins A10 and A11 of the connector 801 can be used to transmit the differential data signal pair D2 (including TMDS DATA2+ and TMDS DATA2−) defined by HDMI standard. Pins B11 and B10 of the connector 801 can be used to transmit the differential data signal pair D0 (including TMDS DATA0+ and TMDS DATA0−) defined by HDMI standard. Pins B3 and B2 of the connector 801 can be used to transmit the differential data signal pair D1 (including TMDS DATA1+ and TMDS DATA1−) defined by HDMI standard. Nonetheless, FIG. 11A, FIG. 11B and description thereof are merely one of exemplary examples of the invention instead limitation to the invention. The physical layer standard supported by the connector 801 may also be other standards with the bidirectional plug-in function, and the data signals and the output clock signals of the packaged circuit may also support interface standards other than HDMI, which are not particularly limited by the invention.

Figure 12A:
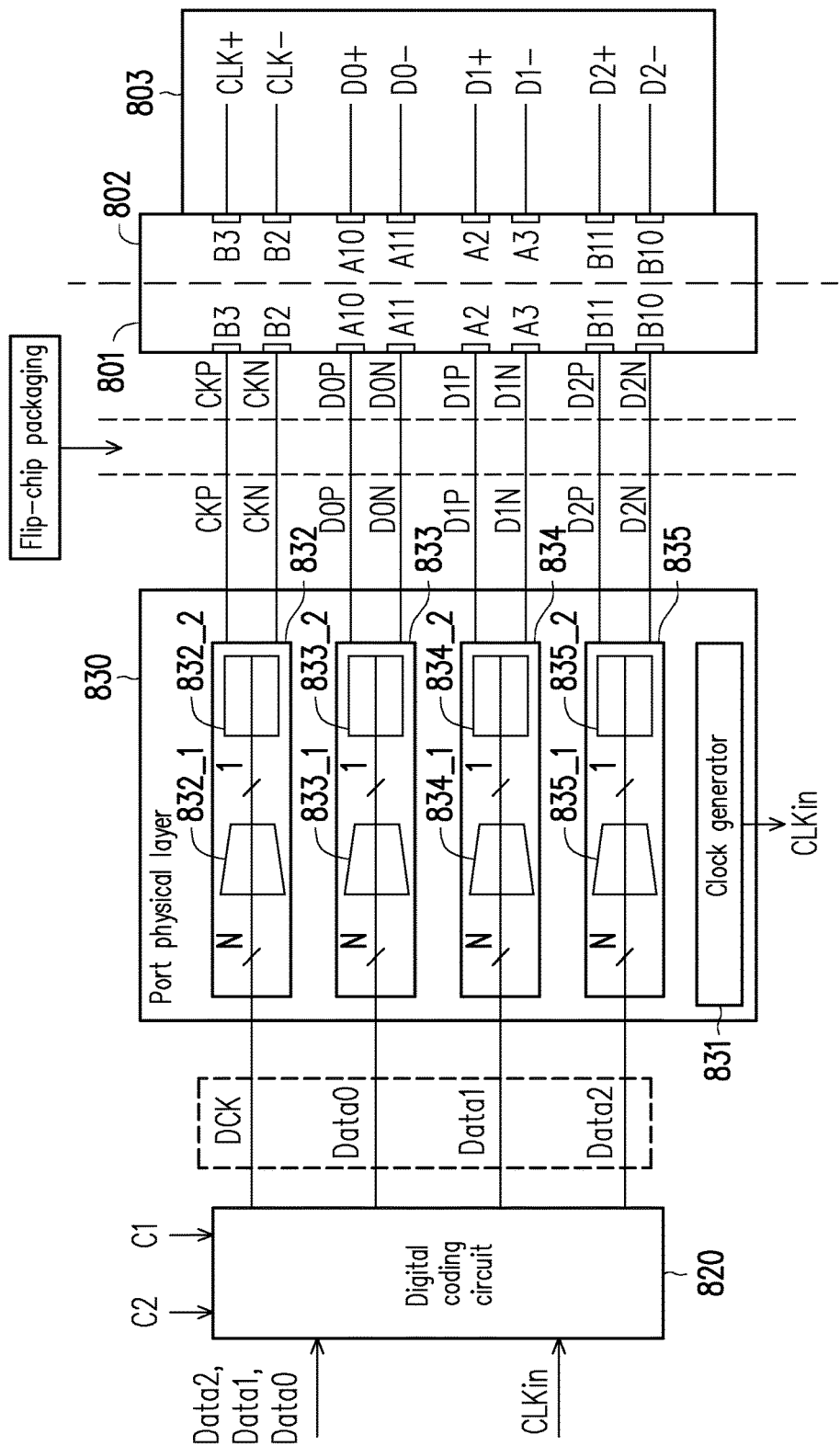
FIG. 12A and FIG. 12B are schematic diagrams illustrating a packaged circuit when the packaging technique is wire bond packaging according to an embodiment of the invention.
Figure 12B:
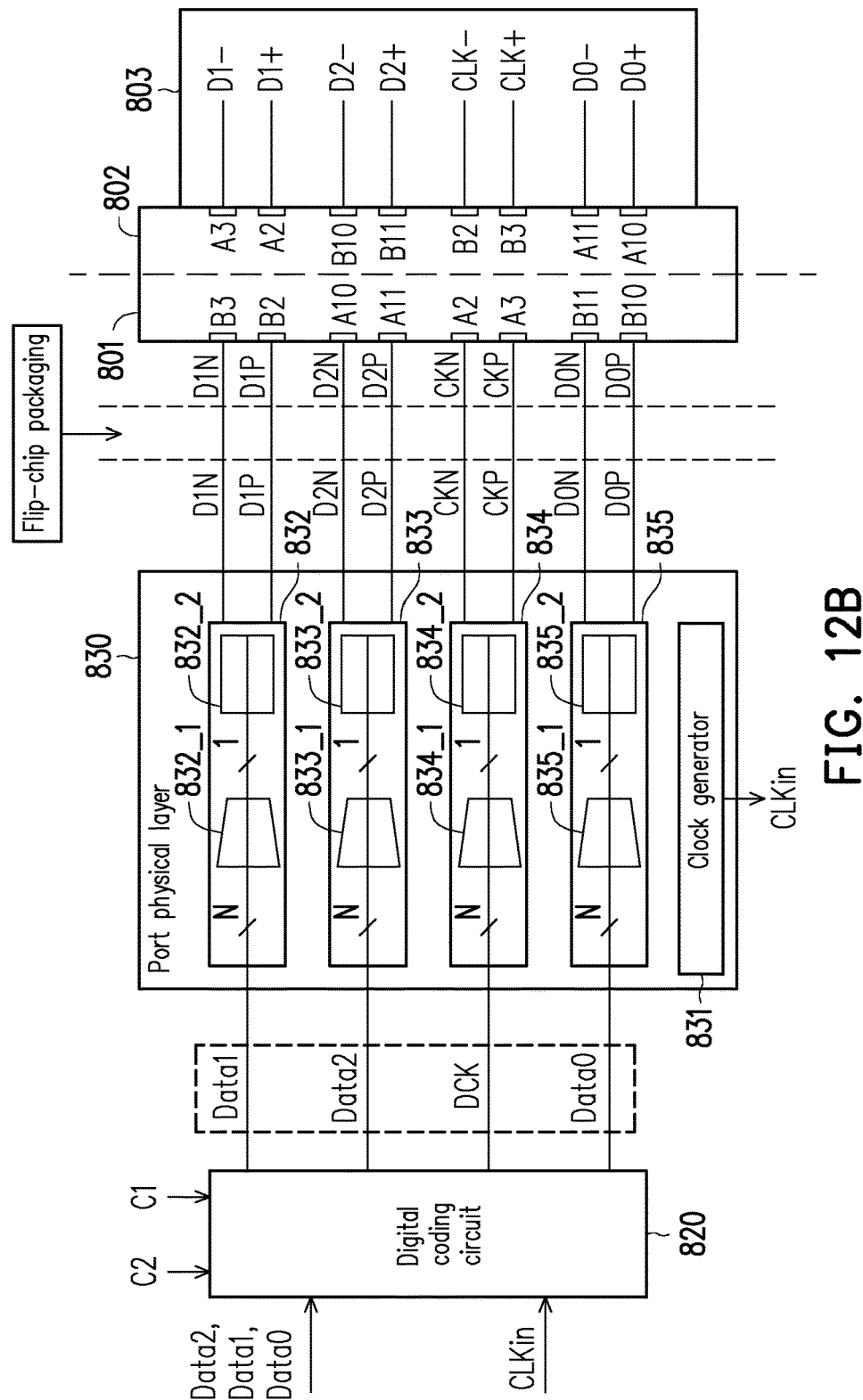

Furthermore, in other embodiments of the invention, the packaged circuit may also control the outputting paths for the output clocks and the data signals according to the applied packaging technique and the plug-in state of the external connector. Hereinafter, description is provided with the pin number in USB type C standard as an example, but the invention is not limited thereto. FIG. 12A and FIG. 12B are schematic diagrams illustrating a packaged circuit when the packaging technique is wire bond packaging according to an embodiment of the invention. With reference to FIG. 12A, when the external connector 802 is connected with the connector 801 in the non-flipped plug-in manner, connection states for each pin of the connector 801 and each pin of the external connector 802 are as shown by FIG. 12A. The pin B3 of the connector 801 is connected to the pin B3 of the external connector 802, the pin B2 of the connector 801 is connected to the pin B2 of the external connector 802, the pin A10 of the connector 801 is connected to the pin A10 of the external connector 802, and the rest can be deduced from the above.

It should be additionally noted that, in the example illustrated in FIG. 12A and FIG. 12B, interconnection between circuits are used to indicate transmission paths for each signal under a signal transmission standard protocol instead of being used to limit a wiring layout when the circuits are practically manufactured. For instance, although the digital coding circuit 820 is illustrated with the clock bits DCK, the digital data Data0, the digital data Data1 and the digital data Data2 outputted from top down in FIG. 12A, persons skilled in the art can adjust the actual wiring layout based on practical application and demand so each signal outputted by the digital coding circuit 820 can be implemented in a different way from the arrangement shown in FIG. 12A.

Further, in the example shown by FIG. 12A, the port physical layer 830 includes the first output-port-circuit 832, the second output-port-circuit 835, a third output-port-circuit 833 and a fourth output-port-circuit 834. Each of the first output-port-circuit 832, the second output-port-circuit 835, the third output-port-circuit 833 and the fourth output-port-circuit 834 respectively includes one serializer (832_1, 833_1, 834_1, 835_1) and one port-driving-circuit (832_2, 833_2, 834_2, 835_2) which are connected to each other. In the example shown by FIG. 12A, under the circumstance where the applied packaging technique is a wire-bond packaging and the plug-in state of the external connector 802 is the non-flipped plug-in state, the digital coding circuit 820 can output the clock bits DCK to the first output-port-circuit 832 according to the control signal C1 responding to the plug-in state and a control signal C2 responding to the packaging technique. At this time, the serializer 832_1 can convert the clock bits DCK from parallel to series.

The port-driving-circuit 832_2 configured to receive the clock bits in series so as to output the output clocks CKN/CKP. Based on the applied wire-bond packaging, the output clocks CKN/CKP can be transmitted to pin B2 and B3 of the connector 801 through the circuit layout on the circuit board. The output clocks CKN/CKP are transmitted to pin B2 and B3 of the external connector 802 via pin B2 and B3 of the connector 801 so that the output clocks CKN/CKP compatible with the standard specification can be received by a channel CLK+ and a channel CLK− in the transmission cable 803.

With reference to FIG. 12A, under the circumstance where the applied packaging technique is the wire-bond packaging and the plug-in state of the external connector 802 is the non-flipped plug-in state, the digital coding circuit 820 can output the data bits of the digital data Data2 to the second output-port-circuit 835 according to the control signal C1 responding to the plug-in state and the control signal C2 responding to the packaging technique. At this time, the serializer 835_1 can convert the data bits of the digital data Data2 from parallel to series.

The port-driving-circuit 835_2 is configured to receive the data bits in series so as to output the data signals D2N/D2P. Based on the applied wire-bond packaging, the data signals D2N/D2P can be transmitted to pin B10 and B11 of the connector 801 through the routing on the circuit board. The data signals D2N/D2P are transmitted to pin B10 and B11 of the external connector 802 via pin B10 B11 of the connector 801 so that the data signals D2N/D2P compatible with the standard specification can be received by a channel D2+ and a channel D2− in the transmission cable 803.

Under the circumstance where the wire-bond packaging is applied and the plug-in state of the external connector 802 is the non-flipped plug-in state, the digital coding circuit 820 can output the data bits of the digital data Data0 to the third output-port-circuit 833. Based on the applied wire-bond packaging, the correspondingly generated data signals D0N/D0P can be transmitted to pin A10 and A11 of the connector 801 through the circuit routing on the circuit board. The data signals D0N/D0P are transmitted to pin A10 and A11 of the external connector 802 via pin A10 and A11 of the connector 801 so that the data signals D0N/D0P compatible with the standard specification can be received by a channel D0+ and a channel D0− in the transmission cable 803.

Under the circumstance where the wire-bond packaging is applied and the plug-in state of the external connector 802 is the non-flipped plug-in state, the digital coding circuit 820 can output the data bits of the digital data Data1 to the fourth output-port-circuit 834. Based on the applied wire-bond packaging, the correspondingly generated data signals D1N/D1P can be transmitted to pin A2 and A3 of the connector 801 through the circuit layout on the circuit board. The data signals D1N/D1P are transmitted to pin A2 and t A3 of the external connector 802 via pin A2 and A3 of the connector 801 so that the data signals D1N/D1P compatible with the standard specification can be received by a channel D1+ and a channel D1− in the transmission cable 803.

Next, with reference to FIG. 12B, when the external connector 802 is connected with the connector 801 in the flipped plug-in manner, connection states for each pin of the connector 801 and each pin of the external connector 802 are as shown by FIG. 12B. Pin B3 of the connector 801 is connected to pin A3 of the external connector 802, pin B2 of the connector 801 is connected to pin A2 of the external connector 802, pin A10 of the connector 801 is connected to pin B10 of the external connector 802, and the rest can be deduced from the above.

In the example shown by FIG. 12B, under the circumstance where the wire-bond packaging is applied and the plug-in state of the external connector 802 is the flipped plug-in state, the digital coding circuit 820 can output the clock bits DCK to the fourth output-port-circuit 834. Based on the applied wire-bond packaging, the correspondingly generated output clocks CKN/CKP can be transmitted to pin A2 and A3 of the connector 801 through the circuit layout on the circuit board. The output clocks CKN/CKP are transmitted to pin B2 and B3 of the external connector 802 via pin A2 and A3 of the connector 801 so that the output clocks CKN/CKP compatible with the standard specification can be received by the channel CLK+ and the channel CLK− in the transmission cable 803.

Moreover, in view of FIG. 12B, persons with ordinary skill in the art should be able to directly and undoubtedly deduce signal transferring methods for the digital coding circuit 820, the port physical layer 830, the connector 801 and the external connector 802 under the circumstance where the wire-bond packaging is applied and the plug-in state of the external connector 802 is the flipped plug-in state based on the foregoing descriptions for the embodiments of FIG. 10A to FIG. 12A and description regarding the output clocks CKN/CKP in FIG. 12B, which are not repeated hereinafter.

Figure 13A:
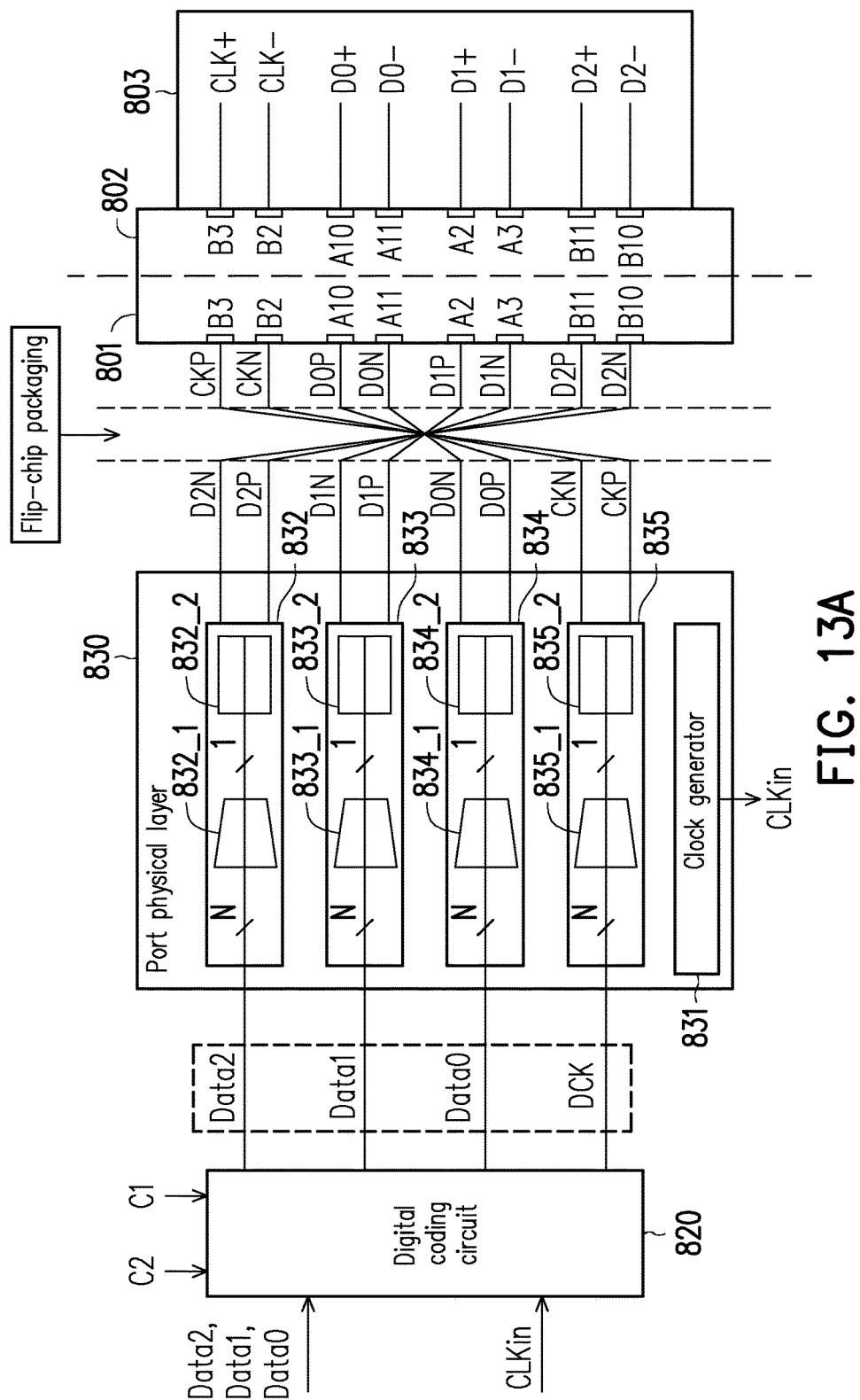
FIG. 13A and FIG. 13B are schematic diagrams illustrating a packaged circuit when the packaging technique is flip-chip packaging according to an embodiment of the invention.
Figure 13B:
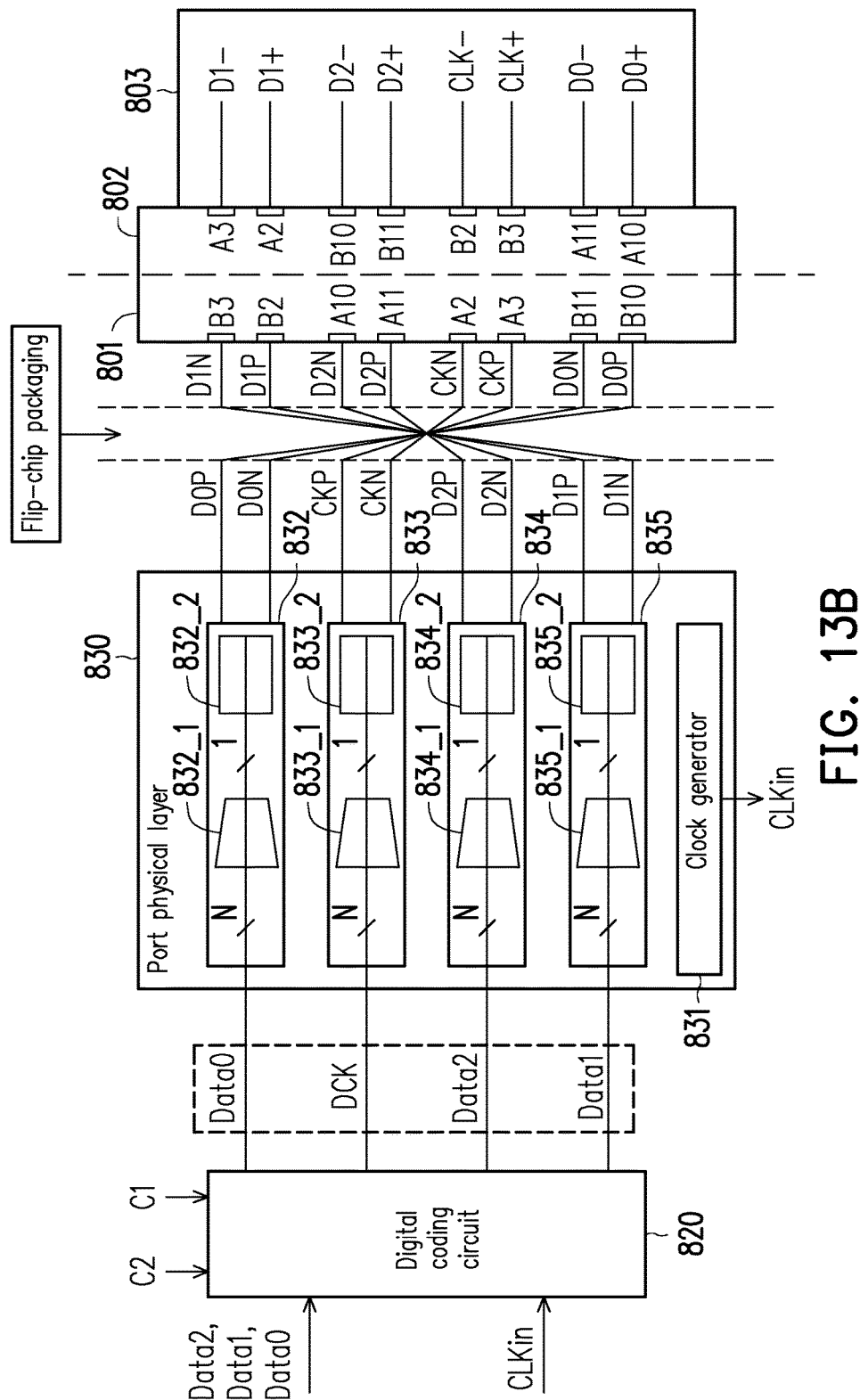

FIG. 13A and FIG. 13B are schematic diagrams illustrating a packaged circuit when the packaging technique is flip-chip packaging according to an embodiment of the invention. With reference to FIG. 13A, under the circumstance where a flip-chip packaging is applied and the plug-in state of the external connector 802 is the non-flipped plug-in state, the digital coding circuit 820 can output the data bits of the digital data Data2 to the first output-port-circuit 832. Based on the applied flip-chip packaging, the correspondingly generated data signals D2N/D2P can be transmitted to pin B11 and B10 of the connector 801 through the circuit layout on the circuit board. The data signals D2N/D2P are transmitted to pin B11 and B10 of the external connector 802 via pin B11 and B10 of the connector 801 so that the data signals D2N/D2P compatible with the standard specification can be received by the channel D2+ and the channel D2− in the transmission cable 803.

Under the circumstance where the flip-chip packaging is applied and the plug-in state of the external connector 802 is the non-flipped plug-in state, the digital coding circuit 820 can output the data bits of the digital data Data1 to the third output-port-circuit 833. Based on the applied flip-chip packaging, the correspondingly generated data signals D1N/D1P can be transmitted to pin A2 and A3 of the connector 801 through the circuit layout on the circuit board. The data signals D1N/D1P are transmitted to pin A2 and A3 of the external connector 802 via pin A2 and A3 of the connector 801 so that the data signals D1N/D1P compatible with the standard specification can be received by the channel D1+ and the channel D1− in the transmission cable 803.

Under the circumstance where the flip-chip packaging is applied and the plug-in state of the external connector 802 is the non-flipped plug-in state, the digital coding circuit 820 can output the data bits of the digital data Data0 to the fourth output-port-circuit 834. Based on the applied flip-chip packaging, the correspondingly generated data signals D0N/D0P can be transmitted to pin A10 and A11 of the connector 801 through the routing on the circuit board. The data signals D0N/D0P are transmitted to pin A10 and A11 of the external connector 802 via pin A10 and A11 of the connector 801 so that the data signals D0N/D0P compatible with the standard specification can be received by the channel D0+ and the channel D0− in the transmission cable 803.

It should be noted that, under the circumstance where the flip-chip packaging is applied and the plug-in state of the external connector 802 is the non-flipped plug-in state, the digital coding circuit 820 can output the clock bits DCK to the second output-port-circuit 835. Based on the applied flip-chip packaging, the correspondingly generated output clocks CKN/CKP can be transmitted to pin B2 and B3 of the connector 801 through the circuit layout on the circuit board. The output clocks CKN/CKP are transmitted to pin B2 and B3 of the external connector 802 via pin B2 and B3 of the connector 801 so that the output clocks CKN/CKP compatible with the standard specification can be received by the channel CLK+ and the channel CLK− in the transmission cable 803.

Moreover, in view of FIG. 13B, persons with ordinary skill in the art should be able to directly and undoubtedly deduce signal transferring methods for the digital coding circuit 820, the port physical layer 830, the connector 801 and the external connector 802 under the circumstance where the flip-chip packaging is applied and the plug-in state of the external connector 802 is the flipped plug-in state based on the foregoing descriptions for the embodiments of FIG. 10A to FIG. 13A, which are not repeated hereinafter.

Besides, in view of FIG. 7 and FIG. 8, it should be known that, the packaged circuit of the invention can determine to output or not to output an output clock to an external connector depending on a transmission interface standard used by the digital controller. Therefore, in one embodiment of the invention, when transmission channels defined by a first transmission interface standard includes a clock channel, the packaged circuit may arrange the output paths for outputting the data signals and the output clock according to a plug-in state of an external controller. In addition, when transmission channels defined by a second transmission interface standard do not include the clock channel, the packaged circuit may also arrange the output paths for outputting each of the data signals according to the plug-in state of the external controller.

Figure 14A:
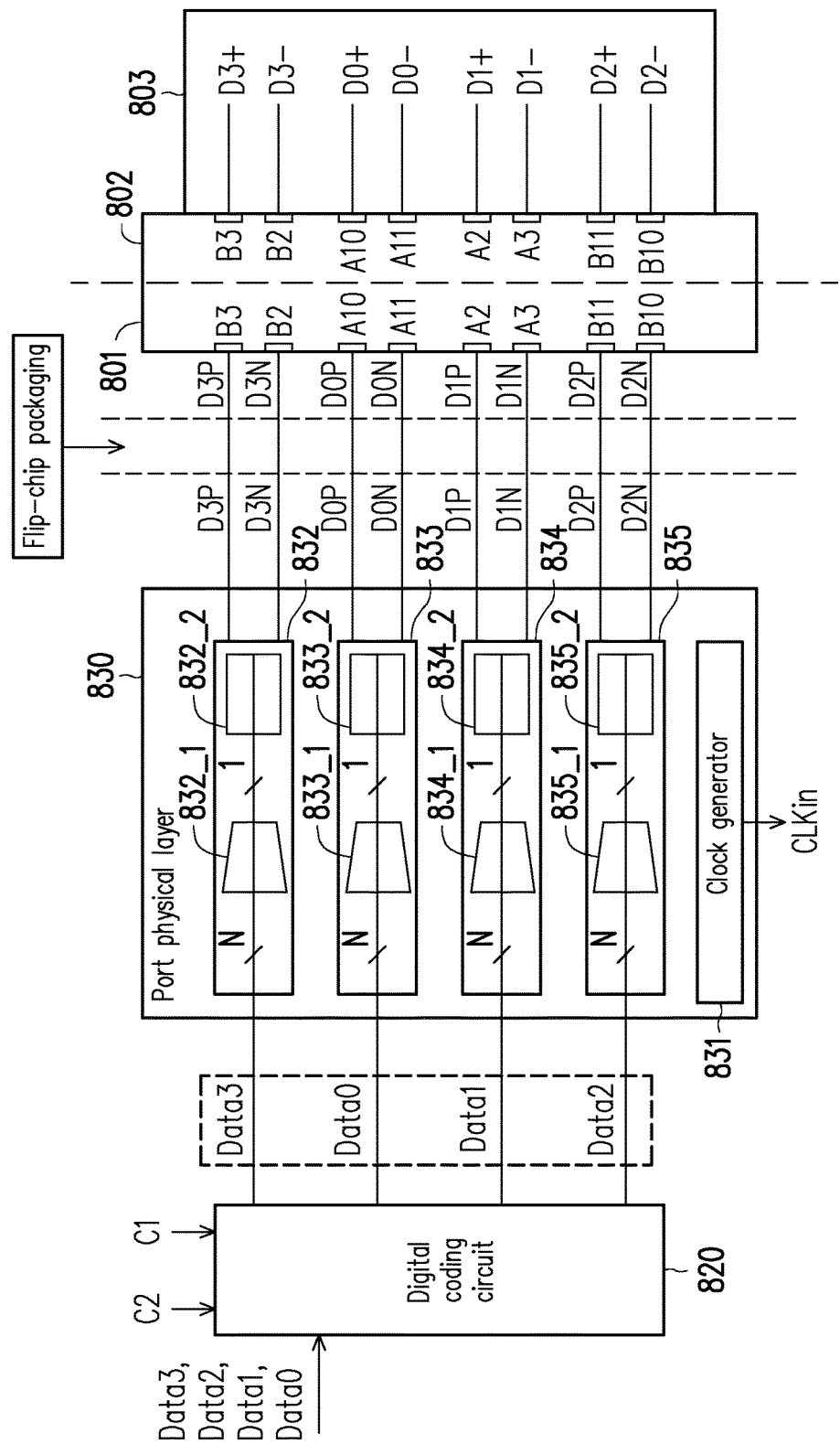
FIG. 14A and FIG. 14B are schematic diagrams illustrating a packaged circuit when the packaging technique is wire bond packaging according to an embodiment of the invention.
Figure 14B:
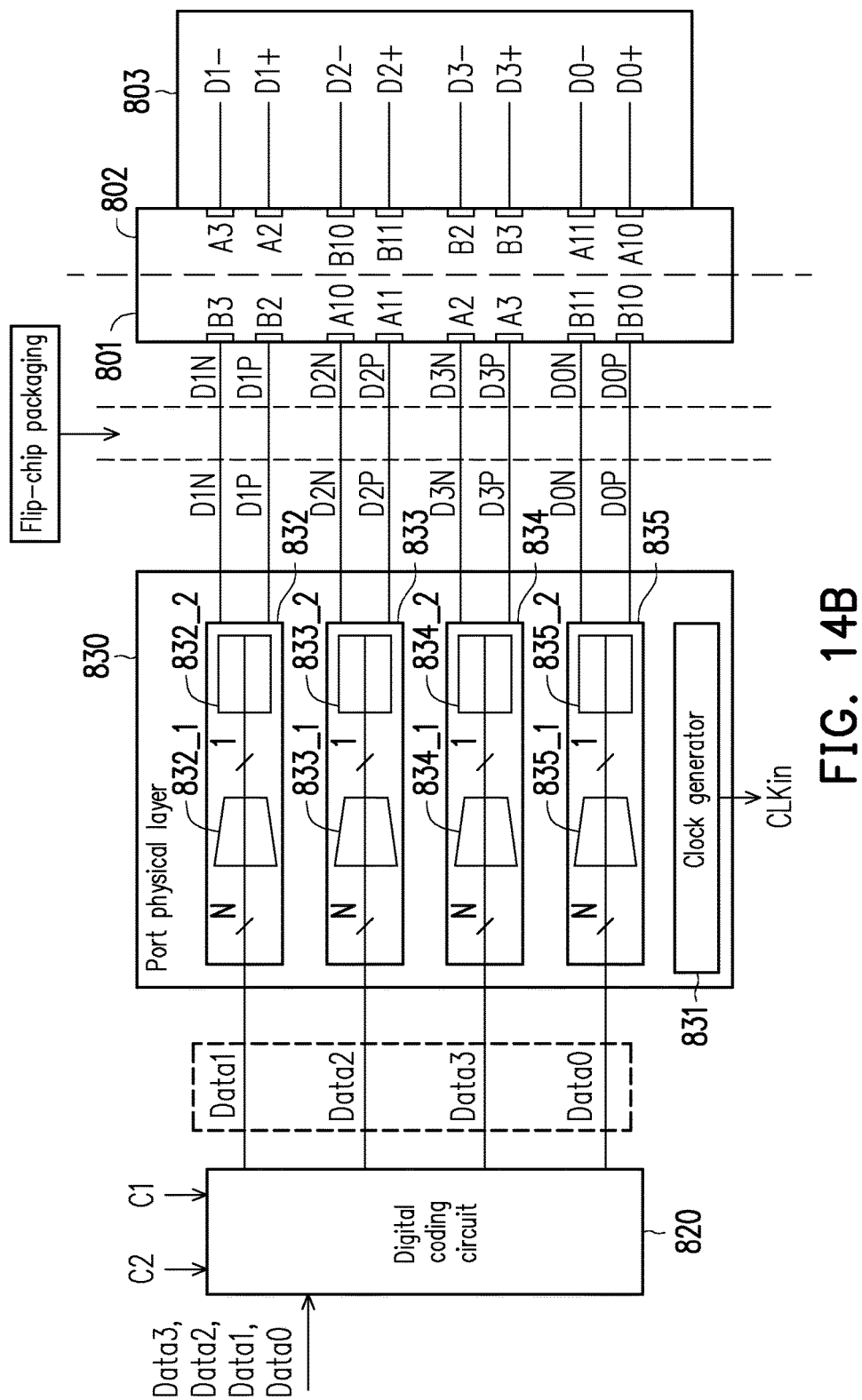

FIG. 14A and FIG. 14B are schematic diagrams illustrating a packaged circuit when the packaging technique is wire bond packaging according to an embodiment of the invention. It should be noted that, comparing with the digital controller utilizing the first transmission interface standard, e.g. HDMI standard version 2.0, in FIG. 12A and FIG. 12B, the digital controller utilizes the second transmission interface standard, e.g. HDMI standard version 2.1, in FIG. 14A and FIG. 14B. Hence, in the examples illustrating in FIG. 14A and FIG. 14B, the digital coding circuit 820 may output the data bits Data0, Data1, Data2, Data3 corresponding to four data channels, and the digital coding circuit 820 may not generate the clock bits.

Based on above, with reference to FIG. 14A, when the packaging technique is wire bond packaging and the external connector 802 is connected with the connector 801 in the non-flipped plug-in manner, the digital coding circuit 820 may output each of the data bits Data0, Data1, Data2, Data3 respectively to the first output-port-circuit 832, the third output-port-circuit 833, the fourth output-port-circuit 834, and the second output-port-circuit 835 according to the control signal C1 responding to the plug-in state and the control signal C2 responding to the packaging technique. Such that, based on the wire bond packaging, the data signals D3N/D3P, D0N/D0P, D1N/D1P, D2N/D2P can be transmitted to the corresponding pins of the connector 801 through the circuit routing on the circuit board, and each of the transmission channels in the transmission cable 803 may receive the data signals D3N/D3P, D0N/D0P, D1N/D1P, D2N/D2P compatible with the standard specification through external connector 802.

With reference to FIG. 14B, when the packaging technique is flip chip packaging and the external connector 802 is connected with the connector 801 in the flipped plug-in manner, the digital coding circuit 820 may output each of the data bits Data1, Data2, Data3, Data0 respectively to the first output-port-circuit 832, the third output-port-circuit 833, the fourth output-port-circuit 834, and the second output-port-circuit 835 according to the control signal C1 responding to the plug-in state and the control signal C2 responding to the packaging technique. Such that, based on the wire bond packaging, the data signals D1N/D1P, D2N/D2P, D3N/D3P, D0N/D0P can be transmitted to the corresponding pins of the connector 801 through the circuit routing on the circuit board, and each of the transmission channels in the transmission cable 803 may receive the data signals D1N/D1P, D2N/D2P, D3N/D3P, D0N/D0P compatible with the standard specification through external connector 802.

Figure 15A:
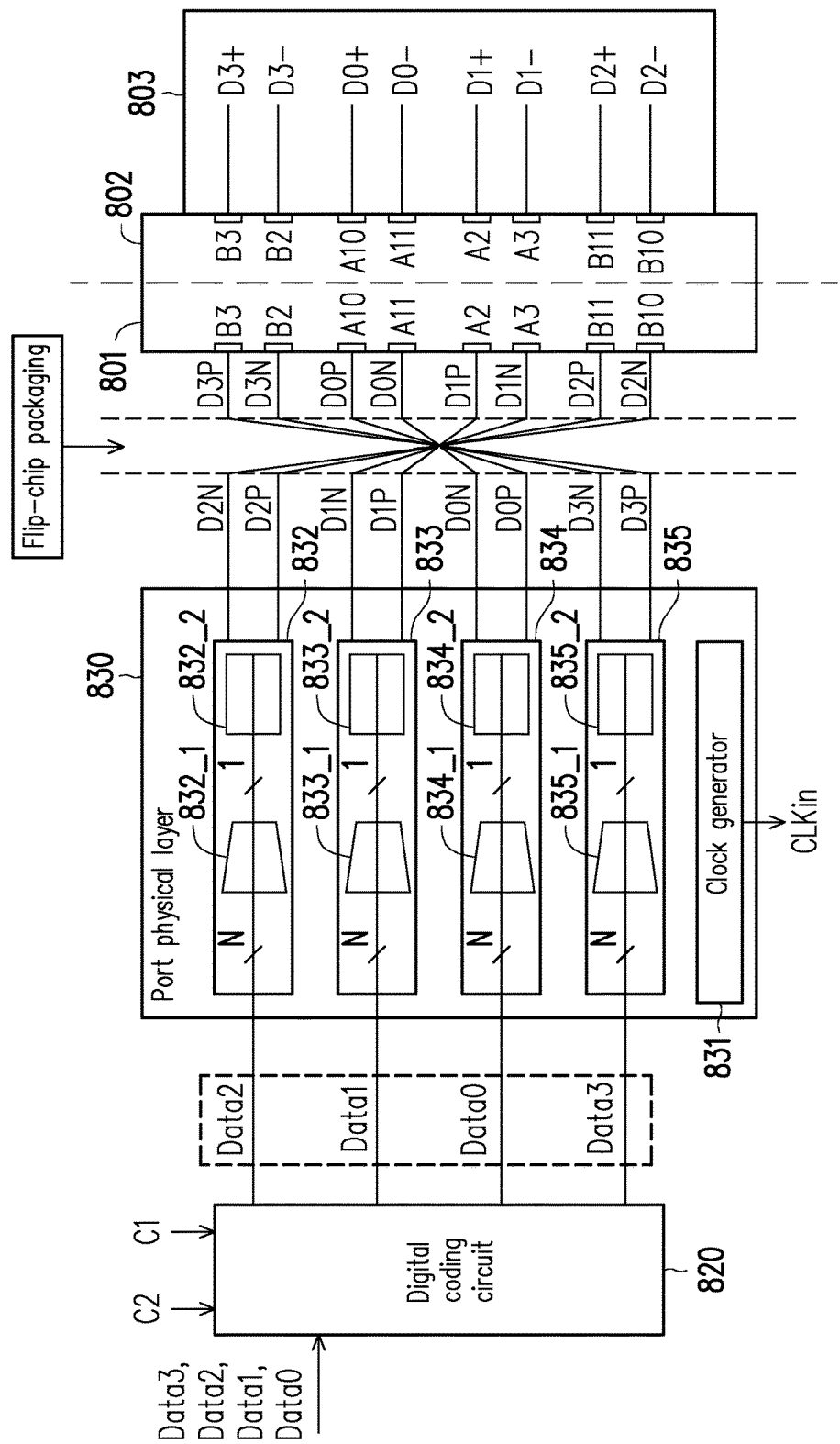
FIG. 15A and FIG. 15B are schematic diagrams illustrating a packaged circuit when the packaging technique is flip-chip packaging according to an embodiment of the invention.
Figure 15B:
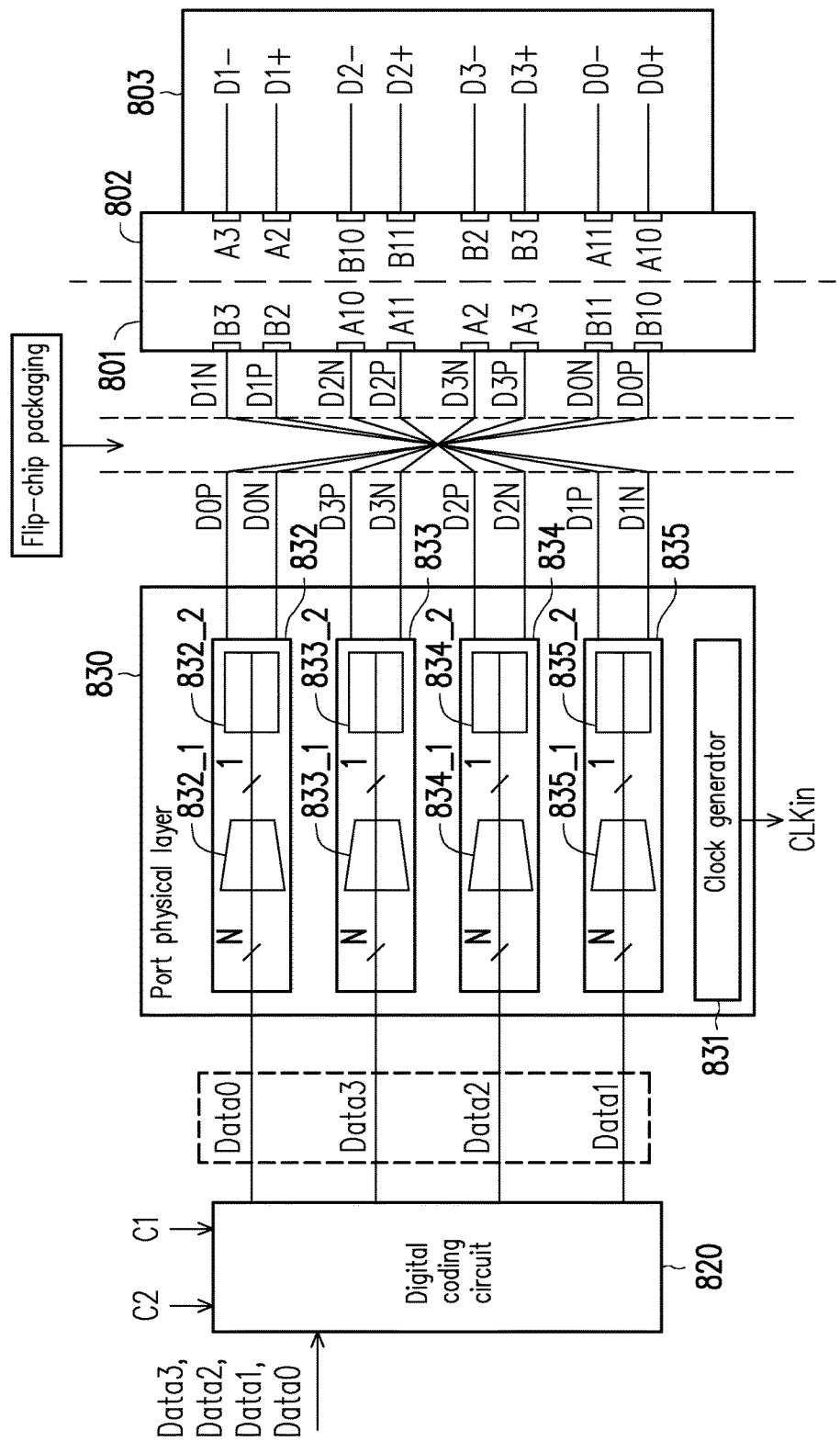

FIG. 15A and FIG. 15B are schematic diagrams illustrating a packaged circuit when the packaging technique is flip-chip packaging according to an embodiment of the invention. It should be noted that, comparing with the digital controllers shown in FIG. 13A and FIG. 13B utilizing the first transmission interface standard, e.g. HDMI standard version 2.0, the digital controllers shown in FIG. 15A and FIG. 15B utilize the second transmission interface standard, e.g. HDMI standard version 2.1. Hence, in the examples illustrating in FIG. 15A and FIG. 15B, the digital coding circuit 820 may output the data bits Data0, Data1, Data2, Data3 corresponding to four data channels, and the digital coding circuit 820 may not generate the clock bits.

Based on above, with reference to FIG. 15A, when the packaging technique is flip-chip packaging and the external connector 802 is connected with the connector 801 in the non-flipped plug-in manner, the digital coding circuit 820 may output each of the data bits Data2, Data1, Data0, Data3 respectively to the first output-port-circuit 832, the third output-port-circuit 833, the fourth output-port-circuit 834, and the second output-port-circuit 835 according to the control signal C1 responding to the plug-in state and the control signal C2 responding to the packaging technique. Such that, based on the flip-chip packaging, the data signals D2N/D2P, D1N/D1P, D0N/D0P, D3N/D3P can be transmitted to the corresponding pins of the connector 801 through the circuit routing on the circuit board, and each of the transmission channels in the transmission cable 803 may receive the data signals D2N/D2P, D1N/D1P, D0N/D0P, D3N/D3P compatible with the standard specification through external connector 802.

With reference to FIG. 15B, when the packaging technique is flip-chip packaging and the external connector 802 is connected with the connector 801 in the flipped plug-in manner, the digital coding circuit 820 may output each of the data bits Data0, Data3, Data2, Data1 respectively to the first output-port-circuit 832, the third output-port-circuit 833, the fourth output-port-circuit 834, and the second output-port-circuit 835 according to the control signal C1 responding to the plug-in state and the control signal C2 responding to the packaging technique. Such that, based on the wire bond packaging, the data signals D0N/D0P, D3N/D3P, D2N/D2P, D1N/D1P can be transmitted to the corresponding pins of the connector 801 through the circuit routing on the circuit board, and each of the transmission channels in the transmission cable 803 may receive the data signals D0N/D0P, D3N/D3P, D2N/D2P, D1N/D1P compatible with the standard specification through external connector 802.

In summary, by digital coding the clock signal generated by the port physical layer, the packaged circuit of the invention can generate the clock bits and output the coded output clocks. Accordingly, by changing the outputting paths for outputting the data bits and the clock bits to the port physical layer, the packaged circuit of the invention can be packaged by the different packaging techniques without changing the layout of the printed circuit board or re-designing the on-chip circuits, and will not be incompatible with other electronic devices on the printed circuit board when the packaging technique is changed. Furthermore, because generation of digitalized clock bits and adjustment on the outputting paths of the digital signals took place in digital domain, the invention can reduce manufacturing costs and easy to implement. In addition, by re-coding the clock signals of the port physical layer, the clock signals of the invention can change the frequency of the output clocks to thereby improve flexibility in die applications. On the other hand, for the connector provided with the bidirectional plug-in function, the packaged circuit of the invention can also determine the outputting paths for outputting the data bits and the clock bits to the port physical layer according to the plug-in state of the external connector. In this way, no matter what the plug-in state is for the plugs of the transmission cable, electronic devices carrying the packaged circuit of the invention can correctly provide the signals compatible with the interface standard specification to another device through the transmission cable. In particular, the packaged circuit of the invention can also correspondingly determine the signal to be received by each output-port-circuit according to both the applied packaging technique and the plug-in state of the external connector to further extend the application range for the packaged circuit of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A packaged circuit, comprising:
    a digital controller, parallel outputting digital data in parallel via a parallel data channel, wherein the digital data comprises a plurality of data bits;
    a port physical layer, comprising a clock generator, and outputting a data signal according to the data bits, wherein the clock generator outputs a clock signal to the digital controller; and
    a digital coding circuit, coupled between the digital controller and the port physical layer, receiving the digital data and the clock signal, generating a plurality of clock bits, and outputting the clock bits to the port physical layer,
    wherein the port physical layer converts the clock bits into an output clock and outputs the output clock,
    wherein the port physical layer comprises a first output-port-circuit and a second output-port-circuit, and the digital coding circuit outputs the clock bits to the first output-port-circuit or the second output-port-circuit according to an operating state of the packaged circuit.

2. The packaged circuit according to claim 1, wherein the digital coding circuit outputs the data bits to the second output-port-circuit when the digital coding circuit outputs the clock bits to the first output-port-circuit.

3. The packaged circuit according to claim 1, wherein the digital coding circuit outputs the data bits to the first output-port-circuit when the digital coding circuit outputs the clock bits to the second output-port-circuit.

4. The packaged circuit according to claim 1, wherein the first output-port-circuit comprises:
    a first serializer, converting one of the data bits and the clock bits from parallel to series; and
    a first port-driving-circuit, coupled to the first serializer, and receiving the data bits or the clock bits in series so as to output the data signal or the output clock.

5. The packaged circuit according to claim 4, wherein the second output-port-circuit comprises:
    a second serializer, converting another one of the data bits and the clock bits from parallel to series; and
    a second port-driving-circuit, coupled to the second serializer, and receiving the data bits or the clock bits in series so as to output the data signal or the output clock.

6. The packaged circuit according to claim 1, wherein the packaged circuit operates in a first operating state of the operating state if the packaged circuit is packaged by a first packaging technique; and wherein the packaged circuit operates in a second operating state if the packaged circuit is packaged by a second packaging technique.

7. The packaged circuit according to claim 6, wherein the packaged circuit further comprises a die body, and wherein an active surface of the die body packaged by the first packaging technique is facing up, and the active surface of the die body packaged by the second packaging technique is facing down.

8. The packaged circuit according to claim 7, wherein a frequency of the clock signal is identical to a frequency of the output clock.

9. The packaged circuit according to claim 7, wherein a frequency of the clock signal is different from a frequency of the output clock.

10. The packaged circuit according to claim 7, wherein the digital coding circuit outputs the clock bits to a first port-driving-circuit of the port physical layer according to the clock signal when the digital controller generates the digital data according to a first transmission interface standard, and the first port-driving-circuit outputs the output clock in response to the clock bits so that the port physical layer outputs the output clock and the data signal which compatible with the first transmission interface standard,
    wherein the digital coding circuit does not generate the clock bits when the digital controller generates the digital data according to a second transmission interface standard, and the first port-driving-circuit of the port physical layer outputs the data signal in response to the data bits so that the port physical layer does not output the output clock but outputs the data signal which compatible with the second transmission interface standard.

11. A packaged circuit, comprising:
    a digital controller, outputting digital data in parallel via a parallel data channel, wherein the digital data comprises a plurality of data bits;
    a port physical layer, connected to a connector, comprising a clock generator, and outputting a data signal to the connector according to the data bits, wherein the clock generator outputs a clock signal to the digital controller; and
    a digital coding circuit, coupled to the digital controller and the port physical layer, receiving the digital data and the clock signal, generating a plurality of clock bits, and outputting the clock bits to the port physical layer, wherein the port physical layer converts the clock bits into an output clock and outputs the output clock, wherein the digital coding circuit outputs the clock bits to a first output-port-circuit or a second output-port-circuit of the port physical layer according to a plug-in state of an external connector plugged in the connector.

12. The packaged circuit according to claim 11, wherein the first output-port-circuit comprises:
a first serializer, converting one of the data bits and the clock bits from parallel to series; and
a first port-driving-circuit, coupled to the first serializer, and receiving the data bits or the clock bits in series so as to output the data signal or the output clock.

13. The packaged circuit according to claim 12, wherein the second output-port-circuit comprises:
a second serializer, converting another one of the data bits and the clock bits from parallel to series; and
a second port-driving-circuit, coupled to the second serializer, and receiving the data bits or the clock bits in series so as to output the data signal or the output clock.

14. The packaged circuit according to claim 11, wherein the digital coding circuit detects the plug-in state of the external connector via a configuration channel pin, and wherein the plug-in state comprises a non-flipped plug-in state and a flipped plug-in state.

15. The packaged circuit according to claim 14, wherein the digital coding circuit outputs the clock bits to the second output-port-circuit when in the non-flipped plug-in state, and the digital coding circuit outputs the data bits to the first output-port-circuit of the port physical layer.

16. The packaged circuit according to claim 15, wherein the second output-port-circuit outputs the output clock to a first data transmission pin of the connector in response to the clock bits, and the first output-port-circuit outputs the data signal to a second data transmission pin of the connector in response to the data bits.

17. The packaged circuit according to claim 16, wherein the digital coding circuit outputs the clock bits to the first output-port-circuit when in the flipped plug-in state, and the digital coding circuit outputs the data bits to the second output-port-circuit.

18. The packaged circuit according to claim 17, wherein the first output-port-circuit outputs the output clock to the second data transmission pin of the connector in response to the clock bits, and the second output-port-circuit outputs the data signal to the first data transmission pin of the connector in response to the data bits.

19. The packaged circuit according to claim 15, wherein the first data transmission pin is configured on a first connection surface of the connector, and the second data transmission pin is configured on a second connection surface of the connector.

20. The packaged circuit according to claim 11, wherein the digital coding circuit outputs the clock bits to the first output-port-circuit or the second output-port-circuit of the port physical layer according to an operating state of the packaged circuit.

21. The packaged circuit according to claim 20, wherein the packaged circuit operates in a first operating state of the operating state if the packaged circuit is packaged by a first packaging technique; and wherein the packaged circuit operates in a second operating state if the packaged circuit is packaged by a second packaging technique.

22. The packaged circuit according to claim 11, wherein a frequency of the clock signal is identical to a frequency of the output clock.

23. The packaged circuit according to claim 11, wherein a frequency of the clock signal is different from a frequency of the output clock.

24. The packaged circuit according to claim 11, wherein the digital coding circuit outputs the clock bits to a first port-driving-circuit of the port physical layer according to the clock signal when the digital controller generates the digital data according to a first transmission interface standard, and the first port-driving-circuit outputs the output clock in response to the clock bits so that the port physical layer outputs the output clock and the data signal which compatible with the first transmission interface standard, wherein the digital coding circuit does not generate the clock bits when the digital controller generates the digital data according to a second transmission interface standard, and the first port-driving-circuit of the port physical layer outputs the data signal in response to the data bits so that the port physical layer does not output the output clock but outputs the data signal which compatible with the second transmission interface standard.

* * * * *